United States Patent
Wu et al.

(10) Patent No.: US 12,089,278 B2
(45) Date of Patent: Sep. 10, 2024

(54) EFFICIENT VEHICLE-TO-EVERYTHING (V2X) PC5 KEEP ALIVE

(71) Applicant: Apple Inc., Cupertino, CA (US)

(72) Inventors: Zhibin Wu, Los Altos, CA (US); Srinivasan Nimmala, San Jose, CA (US); Longda Xing, San Jose, CA (US); Vijay Venkataraman, San Jose, CA (US); Alosious Pradeep Prabhakar, Singapore (SG); Krisztian Kiss, Hayward, CA (US); Haijing Hu, Los Gatos, CA (US); Cahya A. Masputra, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/267,310

(22) PCT Filed: Feb. 13, 2020

(86) PCT No.: PCT/CN2020/075055
§ 371 (c)(1),
(2) Date: Feb. 9, 2021

(87) PCT Pub. No.: WO2021/159380
PCT Pub. Date: Aug. 19, 2021

(65) Prior Publication Data
US 2022/0377828 A1    Nov. 24, 2022

(51) Int. Cl.
*H04W 76/25* (2018.01)
*H04W 76/14* (2018.01)

(52) U.S. Cl.
CPC ........... *H04W 76/25* (2018.02); *H04W 76/14* (2018.02)

(58) Field of Classification Search
CPC ....... H04W 76/25; H04W 76/14; H04W 4/40; H04W 24/08; H04W 92/18;
(Continued)

(56) References Cited

U.S. PATENT DOCUMENTS

2010/0325306 A1* 12/2010 Vimpari .................. H04L 69/28
709/233
2012/0300700 A1    11/2012 Vijayasankar et al.
(Continued)

FOREIGN PATENT DOCUMENTS

CN     101610529 A  * 12/2009  ............ H04W 76/04
CN     101635675 A  *  1/2010  ............ H04W 92/18
(Continued)

OTHER PUBLICATIONS

International Search Report dated Oct. 28, 2020 for International Application No. PCT/CN2020/075055.
(Continued)

*Primary Examiner* — Ayaz R Sheikh
*Assistant Examiner* — Louis Samara
(74) *Attorney, Agent, or Firm* — Eschweiler & Potashnik, LLC

(57) ABSTRACT

A service device (e.g., a user equipment (UE), or other network component) can operate generate sidelink communications with peer UE devices based on PC5 unicast link to enable a direct peer-to-peer communication as part of PC5 vehicle-to-everything (V2X) communications. Radio status link detection can be configured based on a keep alive (KA) coordination scheme via the PC5 unicast link to monitor a status of the PC5 unicast link. A KA timer can be configured based on the KA coordination scheme via the PC5 unicast link. The KA coordination scheme is configured to reduce redundant KA requests in the PC5 unicast link to coordinate the direct peer-to-peer communication across the PC5 unicast link.

17 Claims, 14 Drawing Sheets

(58) Field of Classification Search
CPC .. H04W 36/305; H04W 4/70; H04L 41/0806; H04L 69/28; G06F 11/0757
See application file for complete search history.

(56) References Cited

U.S. PATENT DOCUMENTS

| | | | | |
|---|---|---|---|---|
| 2012/0303773 | A1* | 11/2012 | Rodrigues | H04L 41/0806 709/223 |
| 2018/0092083 | A1* | 3/2018 | Agarwal | H04W 60/04 |
| 2019/0007928 | A1* | 1/2019 | Di Girolamo | H04W 24/08 |
| 2019/0278650 | A1* | 9/2019 | Beifus | G06F 11/0757 |
| 2020/0146094 | A1* | 5/2020 | Wu | H04W 4/40 |
| 2022/0191962 | A1* | 6/2022 | Di Girolamo | H04L 5/0053 |
| 2023/0063048 | A1* | 2/2023 | Fu | H04W 76/14 |
| 2023/0072379 | A1* | 3/2023 | Cheng | H04W 76/12 |

FOREIGN PATENT DOCUMENTS

| | | | | |
|---|---|---|---|---|
| CN | 113661775 | A * | 11/2021 | H04L 1/1812 |
| KR | 20220137010 | A * | 2/2020 | |

OTHER PUBLICATIONS

"PC5 unicast link keep-alive procedure." Source: Qualcomm Incorporated, LG Electronics, CATT, Ericsson, OPPO, Apple, Huawei, HiSilicon, Agenda Item: 16.2.13. 3GPP TSG-CT WG1 Meeting #122-e, Electronic meeting; Feb. 20-28, 2020 (was C1-200350, C1-200327 & C1-200632).

3rd Generation Partnership Project; Technical Specification Group Services and System Aspects; Architecture enhancements for 5G System (5GS) to support Vehicle-to-Everything (V2X) services (Release 16); 3GPP TS 23.287 V16.1.0; Dec. 2019.

3rd Generation Partnership Project; Technical Specification Group Radio Access Network; NR; NR and NG-RAN Overall Description; Stage 2 (Release 16); 3GPP TS 38.300 V16.0.0; Dec. 2019.

RAN2; "Response LS on SL RLM/RLF"; 3GPP TSG-RAN WG2 Meeting #108; R2-1916621; Nov. 18, 2019.

Ericsson; Support for Keep-Alive Functionality of NR PC5 Link; SA WG2 Meeting #S2-136AH; S2-2000354; Jan. 13, 2020.

Qualcomm Incorporated, LG Electronics, Ericsson, CATT; Support of keep-alive signalling for unicast layer-2 link; 3GPP TSG-SA WG2 Meeting #136AH; S2-2000972; Jan. 13, 2020.

European Extended Search Report dated Aug. 25, 2023 in regards to Patent Application No. EP20918655.

* cited by examiner

UNICAST

GROUPCAST

BROADCAST

EFFICIENT VEHICLE-TO-EVERYTHING (V2X) PC5 KEEP ALIVE

REFERENCE TO RELATED APPLICATION

This application is a National Phase entry application of International Patent Application No. PCT/CN2020/075055 filed Feb. 13, 2020, and is hereby incorporated by reference in its entirety.

FIELD

The present disclosure relates to wireless technology and more specifically to vehicle-to-everything (V2X) or similar devices for PC5 keep alive.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

Some services have ultra-low latency, high data capacity, and strict reliability requirements, as any faults or performance issues in the networks can cause service failure which may result in property damage and body injury. A type of mobile communication includes vehicle communication, where vehicles communicate or exchange vehicle related information. The vehicle communication can include vehicle to everything (V2X), which can include vehicle to vehicle (V2V), vehicle to infrastructure (V2I), and vehicle to pedestrian (V2P), or the like, in which each can include a user equipment (UE) or base station device such as a new radio NodeB (gNB), an eNodeB (eNB), or other device/node. A V2X node, for example, can comprises a new radio NodeB (gNB), an eNodeB (eNB), a user equipment (UE), a Roadside Unit (RSU), a drone, or other vehicle device, or network device when referred to herein. In some situations, vehicle related information is intended for a single vehicle or other entity. In other situations, such as emergency alerts, vehicle related information is intended for a large number of vehicles or other device entities. The emergency alerts can include collision warnings, control loss warnings, collision avoidance, pedestrian safety and other coordination to ensure safe and efficient traffic flows, especially in vehicle (e.g., auto, craft, drone, etc.) to vehicle communications.

DETAILED DESCRIPTION

Figure 1A:
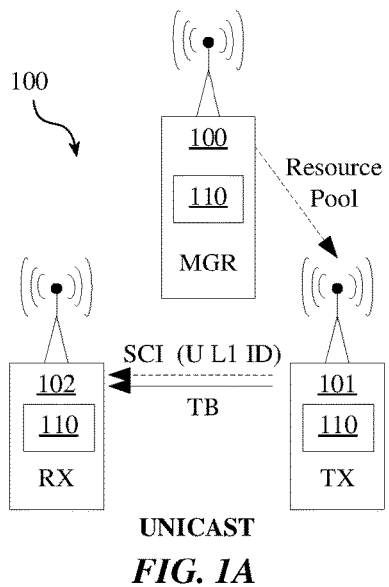
FIG. 1 is a block diagram illustrating an example of user equipment(s) (UEs) communicatively coupled a network with network components as peer devices useable in connection with various embodiments (aspects) described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of various concerns for PC5 vehicle-to-everything UE communication including direct peer-to-peer communications various keep alive coordination schemes among UEs can be enabled via a PC5 unicast link. A UE can establish, configure, or set up the PC5 unicast link for the PC5 V2X communication. Radio status link detection via one or more UE connected in the PC5 unicast link based on a keep alive (KA) coordination scheme to monitor a status of the PC5 unicast link as well as the activity of a peer device that it is communicatively coupled with over the PC5 unicast link. The UEs can configure their respective KA timers based on the particular KA coordination scheme. The KA coordination scheme reduces redundant KA requests in the PC5 unicast link to coordinate the direct peer-to-peer communication across the PC5 unicast link and further avoid KA request collisions or being communicated concurrently with one another.

Embodiments (aspects) include UEs to establish a reliable radio link status detection using the KA coordination scheme(s) via one or more protocol layers (e.g., the access stratum (AS) layer or the like. For the transmit (Tx) side (e.g., Tx-UE), even if hybrid automatic repeat request (HARQ) feedback were utilized, there is no guarantee that there is traffic over the PC5 unicast link for the detection. Additionally, the HARQ feedback may be tied to a particular PC5 QoS Flow, and not necessarily reflect the general status of a PC5 unicast link. To handle this, mechanism(s) and process flow(s) of keep alive between UE-1 and UE-2 unicast link can be configured. UE-1 (or UE-2), can initiate a keep alive request at expiry of a configured timer. The peer UE can respond back with KA acknowledgement (KA ACK). However, several key functionalities and unique challenges remain open regarding KA mechanisms between peer UEs in PC5 V2X communication. Without co-ordination, both UE1 and UE2 could initiate Keep-alive request together since their respective timers may expire at a same time, and then respond back with keep alive acknowledgement. This may lead to redundant PC5 signaling messages, which is inefficient to the connecting link.

Direct communication between vehicle and other devices (V2V, V2I) uses so-called public or mission critical (PC)5 interface. PC5 refers to a reference point where the UE (V-UE, RSU or the like) directly communicates with another UE over the direct channel. In this case, the communication with the base station is not required. In system architectural level, proximity service (ProSe) is the feature that specifies the architecture of the direct communication between UEs. In 3GPP RAN specifications, "sidelink" is the terminology to refer to the direct communication over PC5. PC5 interface was originally defined to address the needs of mission-critical communication for public safety community (Public Safety-LTE, or PS-LTE) in release 13. The motivation of the mission-critical communication was to allow law enforcement agencies or emergency rescue to use the LTE communication even when the infrastructure is not available, such as natural disaster scenario. In release 14 onwards, the use of PC5 interface has been expanded to meet various market needs, such as communication involving wearable devices such as smartwatch. In C-V2X, PC5 interface is re-applied to the direct communication in V2V and V2I, as well as other V-UEs. Additionally, a unicast can refers to a one-to-one transmission from one point in the network to another point; that is, one sender and one receiver, where each can have a network address uniquely identifying a single endpoint. Additional aspects and details of the disclosure are further described below with reference to figures.

Figure 1B:
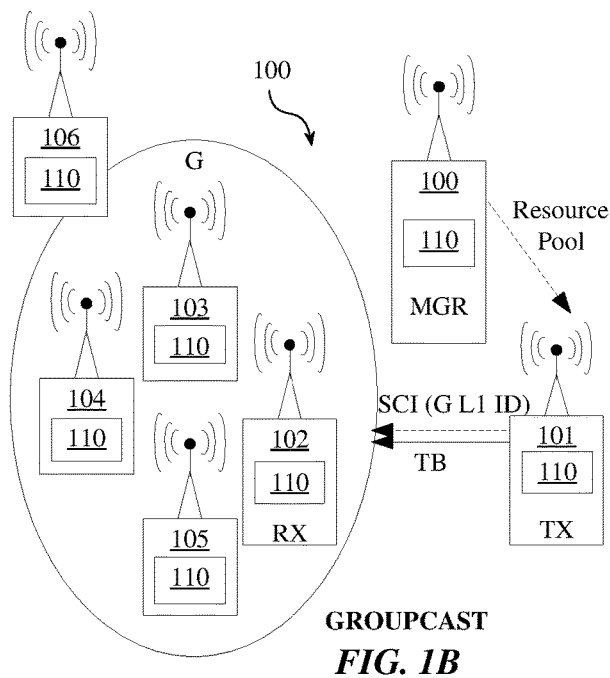
Figure 1C:
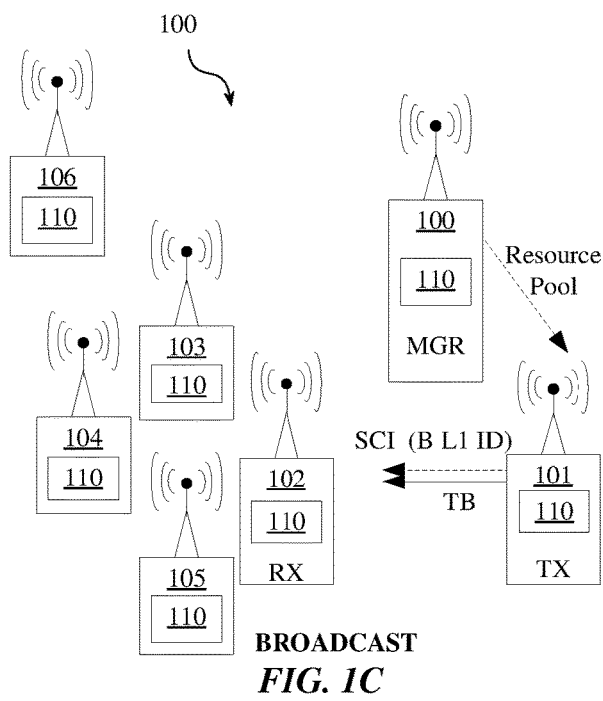

FIGS. 1A-1C are block diagrams of a wireless communication network 100 in which wireless communication devices (e.g., user equipment (UE) devices) can use unicast, groupcast, and broadcast communication in accordance with one or more embodiments herein, for example. Each device in the network includes vehicle-to-everything (V2X) circuitry 110 that includes memory storage and processing circuitry/components including one or more processors configured to perform various types of V2X communication. For the purposes of this description, when a "device" is described as performing some function, it can be understood that it is the processor(s)/component in the V2X device circuitry that is performing the function.

A transmitting (TX) device (e.g., Tx-UE or device 101) seeking to transmit data to one or more receiving (RX) device(s) in the wireless communication network first determines sidelink channel resources that are available for this purpose. In Mode 1 (not shown), the TX device 101 requests sidelink channel resources from a manager device 100 that coordinates communication between the devices in the network. The manager device 100 may be another UE device or a base station device (gNB, eNB, and so on). The manager device 100 provides downlink (DL) control information (DCI) or sidelink configured grant configurations to the TX device that identifies specific sidelink channel resources to be used by the TX device to transmit data. The specific sidelink channel resources are selected from a resource pool allocated to the network.

Depending on whether the TX device is going to perform a unicast, groupcast, or broadcast transmission of data, the TX device determines (e.g., via higher layer signaling) a Layer-1 destination identifier (L1 destination ID) that uniquely identifies one or more channels between the TX device 101 and a specific RX device (a unicast identifier), a group of RX devices (a groupcast identifier), or all RX devices or Rx-UEs (a broadcast identifier) in the wireless communication network. In one example, the channels identified by L1 destination IDs are physical sidelink control channels (PSCCH).

In Mode 2 (shown in FIGS. 1A-1C), the TX device 101 selects sidelink channel resources for transmitting data from a pre-allocated resource pool received a priori from a manager device or network component rather than receiving a designation or allocation of particular sidelink communication resources from the manager device 100.

In the unicast example of FIG. 1A, TX device 101 can be configured transmit data to RX device 102 and no other device. To enable this "direct" communication, the TX device 101 can utilize a unicast L1 destination ID for the device 102 to initiate communication with the RX device 102. TX device 101 sends sidelink control information (SCI) using PSCCH resources associated with the L1 destination ID for RX device 102. The SCI instructs the RX device 102 how to subsequently receive a transport block (TB) of data from TX device 101. For example, the SCI includes the unicast L1 destination ID for the RX device 102 and identifies frequency and time resources that specify a physical sidelink shared channel (PSSCH) that will be used to transmit (and retransmit in certain circumstances) the TB. The SCI may also instruct the RX device whether to provide feedback, such as an ACK/NACK indication, to confirm receipt of the TB or to communicate that the TB was not received. To this end, the SCI may include a hybrid automatic repeat request (HARQ) process identifier that uniquely identifies the TB for use by the RX device in providing feedback.

In the groupcast example of FIG. 1B, TX device 101 seeks to transmit data to a group G that includes several devices 102, 103, 104, 105 (while only four devices are in the illustrated group, a different number may be in a group). A Groupcast L1 destination ID identifies PSCCH channel(s) monitored by devices in group G for SCI. To enable the groupcast communication, the TX device 101 determines the L1 destination ID for the group G. TX device 101 sends SCI using the PSCCH resources associated with the L1 destination ID for group G. The SCI instructs devices in group G how to subsequently receive a TB from device 101. For example, the SCI includes the groupcast L1 destination ID for the group G and identifies frequency and time resources that specify a physical sidelink shared channel (PSSCH) that will be used to transmit and retransmit (in certain circumstances) the TB.

The SCI may indicate a groupcast option 1 or 2 that instruct the RX devices in the group G whether and how to provide feedback. In groupcast option 1, when feedback is enabled the only type of feedback provided by the RX device is NACK, and in some examples, when a particular RX device is outside a communication range specified in the SCI the RX device does not provide any feedback. In groupcast option 2, when feedback is enabled, both ACK/NACK feedback are provided the by the RX device. The SCI may include a hybrid automatic repeat request (HARQ) process identifier that uniquely identifies the TB for use by the RX device in providing feedback.

Figure 10:
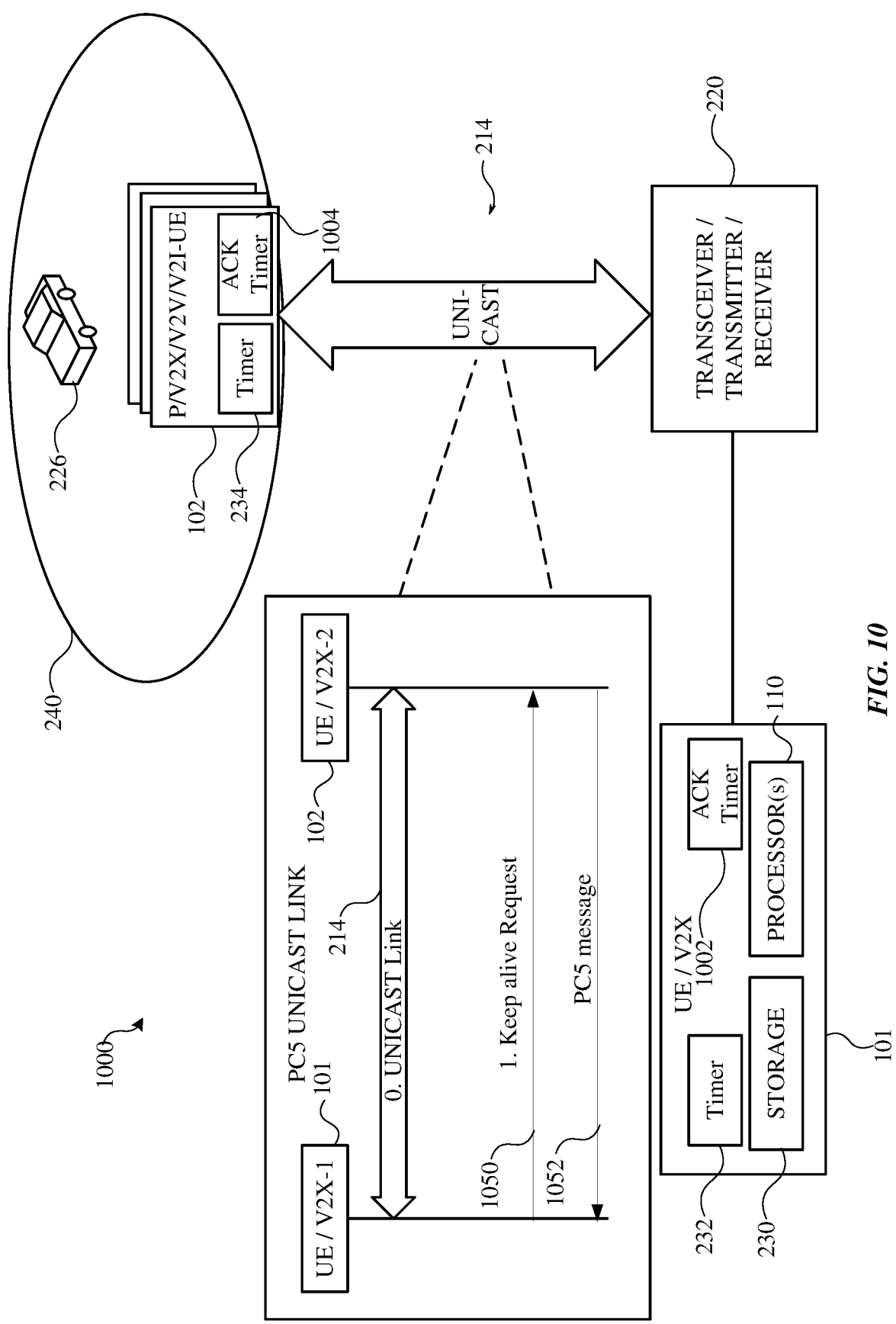
FIG. 10 is another example block diagram for processing direct peer-to-peer communications with at least one PC5 unicast link for a KA coordination scheme according to various embodiments described herein.

In the broadcast example of FIG. 10, TX device 101 seeks to transmit data to all devices in the network. A Broadcast L1 destination ID identifies PSCCH channel(s) monitored by all devices in the network for SCI. To enable the broadcast communication, the device 101 determines the broadcast L1 destination ID for the network. TX Device 101 sends SCI using the PSCCH resources associated with the broadcast L1 destination ID for the network. The SCI instructs devices the network how to subsequently receive data from device 101. For example, the SCI includes the broadcast L1 destination ID and identifies frequency and time resources that specify a physical sidelink shared channel (PSSCH) that will be used to transmit and retransmit (in certain circumstances) the TB.

Two modes of operation for V2X communication can be configured, namely over the PC5 and over LTE-Uu. LTE-Uu can be unicast or multimedia broadcast services (MBMS). These two operation modes may be used by a UE independently for transmission and reception (e.g. a UE can use MBMS for reception without using LTE-Uu for transmission). A UE may also receive V2X messages via LTE-Uu unicast downlink. For both operation modes, V2X devices (e.g. in different domains) can communicate with each other for the exchange of V2X messages. The interface between V2X application servers and the methods of the exchange of messages between V2X application servers is out of scope of 3GPP.

Figure 2:
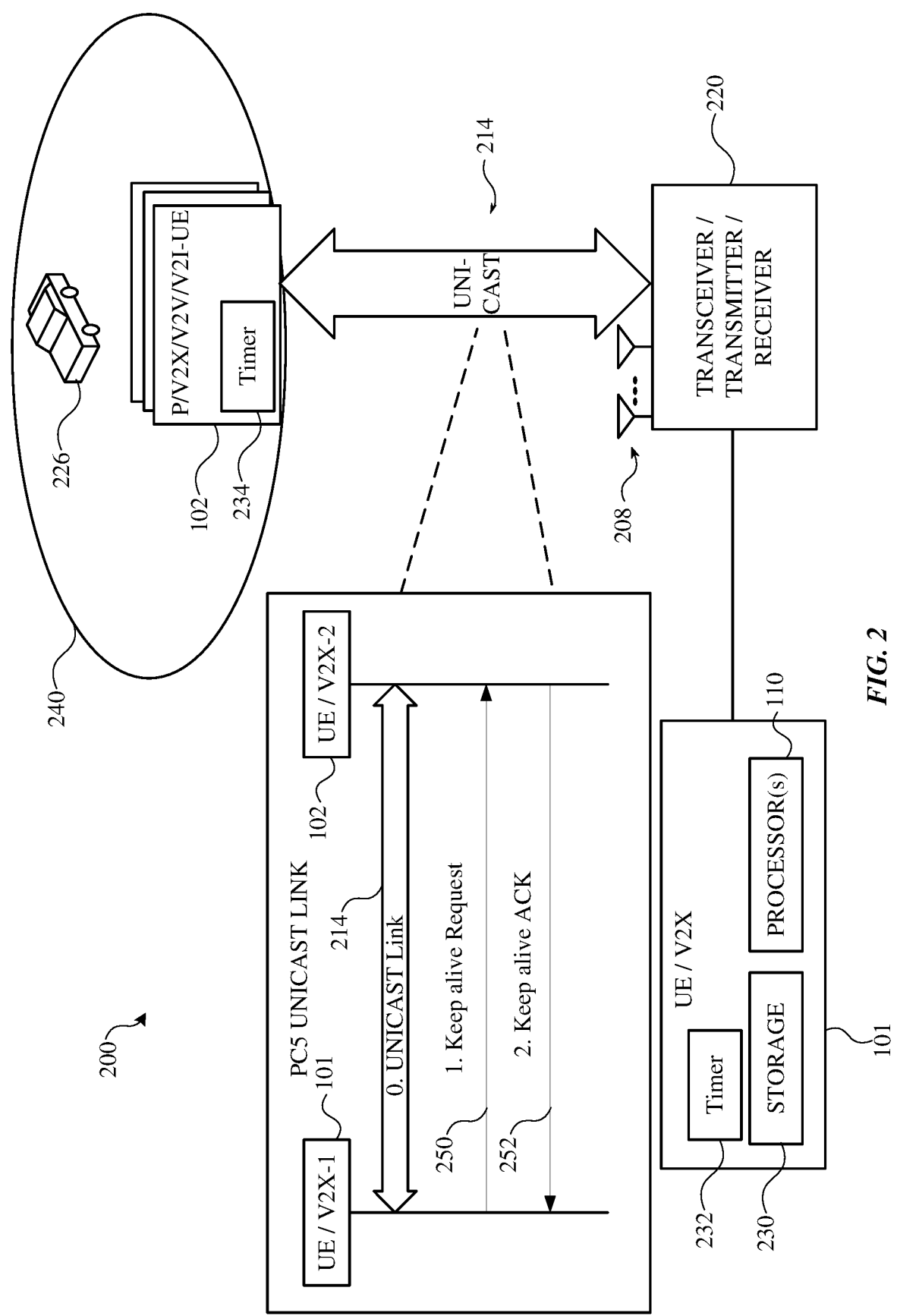
FIG. 2 is a block diagram illustrating a system employable at a UE according to various embodiments described herein.

Referring to FIG. 2, illustrated is a block diagram of a system 200 employable at UE/V2X 101, UE 102, or participating/peer entities 240 in direct peer-to-peer communication. System 200 can include processor(s) 210 comprising processing circuitry and associated interface(s) (e.g., a communication interface for communicating with communication circuitry 220, a memory interface for communicating with memory 230, etc.), communication circuitry 220 (e.g., comprising circuitry for wired and/or wireless connection(s), e.g., transmitter circuitry (e.g., associated with one or more transmit chains) and/or receiver circuitry (e.g., associated with one or more receive chains). This transmitter circuitry and receiver circuitry of transceiver 220 can employ common or distinct circuit elements, or a combination thereof). The memory 230 can comprise any of a variety of storage mediums and can store instructions or data associated with one or more of processor(s) 210 or the communication circuitry 220. In embodiments, signaling or messaging between different embodiments of system 200 can be generated by processor(s) 210, transmitted by communication circuitry 220 over a suitable interface or reference point (e.g., PC5, etc.), received by communication circuitry 220, and processed by processor(s) 210.

The UE 101 can receive V2X configuration information when the UE is authorized to use V2X services over the 3GPP network. This authorization is done by a V2X function in the core network, and part of the authorization procedure the V2X function can send a list of preferred air interface technologies, for example. Alternatively, V2X configuration can be performed by an application server that is not part of the core network. The UE 101 can employ one or more channel quality measurements such as power measurements or other measurements related to sidelink communication for direct peer-to-peer communication.

V2X UEs can be in a given coverage area inside a cell covered by an gNB that supports 5G, LTE and dedicate short range communication (DSRC) road side unit (RSU) functionality. These UEs 240 can notify the gNB/RSU which V2X communication radio access technology(ies) (RAT(s)) is/are supported. Based on that information, the network can choose an access technology for the UEs to use. The system 200 includes vehicle/traffic participant entities 240. The vehicle/traffic participant entities 240 include one or more pedestrian devices (P-UEs) 222, infrastructure entities 224 (e.g., RAN 120), vehicle entities 226, or other network device(s)/component(s). The V2X UE 101 can also include one or more antenna 208 for communications, which includes sidelink communications 214 with the vehicle/traffic participant entities or peer devices 240.

The vehicle communications between the V2X UE 101 and any vehicle/pedestrian device entities 240 can utilize co-operative awareness that includes information from other vehicles, sensors and the like, to process and share the information to provide vehicle services such as collision warning, autonomous driving, and the like. The V2X UE 101 is configured to obtain, select or determine QoS attributes associated with sidelink communications. Communications/communication configurations herein can include transmission resources, a frame structure design, a transmit power for broadcast (communication), a subframe structure, a modulation and coding scheme (MCS), number of occupied sub-channels/Time Transmission Intervals (TTIs), a resource reservation interval/period, range of transmission per transport block (TB), channel busy ratio (CBR), channel occupancy ratio (CR), CR limit (CR_limit), associated LTE parameters in 3GPP, or the like. For example, the frame structure has parameters including sampling rate, frame length, subframe length, subcarrier spacing and cyclic prefix length and are based on the obtained success ratio.

The sensing operations can be a simplified sensing procedure for V2X UE resource selection aiming to reduce complexity and power consumption. In general, the principles of sensing and resource selection procedure can be used for sidelink communication management. The resource (re)selection triggering utilized herein can include a resource reselection counter, a probabilistic reselection based on a probability to reselect one or more resources, and one or more reselection triggering conditions including whether the UE 101, for example, skips transmission on a preconfigured/predetermined number of resource reservation cycles. In particular, modifications could be considered in a resource exclusion operation and sidelink (SL) received signal strength indication (SL-RSSI) averaging of non-excluded resources, or other sidelink channel indication. Such indication, can provide whether the sidelink signal or sidelink synchronization reference has been lost or not available for initial sidelink synchronization, for example.

Embodiments herein include various mechanisms including enhanced NR sidelink communication operations with a PC5 unicast link 214 between UEs with components, configurations, or processes for resource allocation to enable device-to-device (D2D) or sidelink communications in one or more UEs 101, 102, V-UEs 226, or other networked devices 240 for direct communication between these devices. In PC5 V2X communication, there may be several different combinations between source and peer UEs including one or more of: V2V, V2P, V2I, RSU or other UE as a UE or V-UE as peers participating direct peer-to-peer/sidelink communication in co-ordination with one another. If there is no co-ordination, then it may happen that both UE1 101 and UE2 102, for example, will initiate a Keep-alive request 250 at the same time (or back to back) since their KA timers 232, 234, respectively, may expire at a same time. Then subsequently both UEs would have to respond back with a Keep Alive Ack 252 to the peer's KA request to indicate that the link 214 is still active. This may lead to redundant PC5 signaling messages which is desired to be avoided, and further leads to PC5 redundant signaling or higher unnecessary traffic over the unicast link 214.

Various KA coordination schemes can be thus configured for optimal Keep alive procedures and efficiency over the PC5 unicast link 214, as a direct link to a single entity with a PC5 reference point. In one aspect, the UE 101 or 102 can define a KA initiator that is the designated device to initiate KA requests 250 specifically. In particular, UE1 101 could be the one to initiate, set up or establish the PC5 unicast link to UE2 102, and thus be designated as the KA initiator among the peer devices (UE1 101 and UE2 102) over the PC5 unicast link 214.

KA operations at each UE operate when there is a period of inactivity on the link 214 in order to determine whether to keep the link 214 active or not. The timers 232 and 234 of each UE initiate, and if the timer (e.g., 232 of UE1 101) with a shorter timer value (e.g., x) expires first, then a KA request is communicated over the link 214 by UE1 101 In response, the receiving UE (e.g., UE2 102) responds with a KA ACK 652, while stopping the timer 234 configured with the longer duration (e.g., x+y). If no KA request is received by expiration of the longer timer value (e.g., x+y), then this can be considered a failure condition and the UE (e.g., UE2 102) initiates the KA request in response to the timer expiration.

In an embodiment, UE1 101 and UE2 102 can generate a determination of whether the UE1 101 or UE2 102, coupled to the PC5 unicast link, operates as a KA request initiator to initiate one or more KA requests based on an origination of a first PC5 message establishing the direct link setup for the PC5 unicast link 214, or from a last action on the PC5 unicast link that occurred, where the last action comprises a receiving or a transmitting of the PC5 message. Then whichever UE devices is designated as the KA request initiator provides the KA requests 250 for a period or during the PC5 unicast link 214 activation.

In one embodiment, KA requests can be initiated by a same UE (either UE-1 or UE-2) based on which one previously initiated the first PC5 message to initiate the direct link establishment between UE1 101 and UE2 102 for the direct peer-to-peer communications with the PC5 unicast link 214. This could be an implicitly defined designation of the KA initiator, for example, implied at setup based on which device sends a first PC5 message over the PC5 unicast link 214, or could be explicitly defined by including a new field 'KA initiator' in a direct link establishment request message, or as an initial/first PC5 message. This will further make it clear and cause no confusion on who will initiate the KA requests 250. For example, if UE1 101 had initiated the direct link setup with UE2 (e.g., at so-called step 0, or step zero), then the direct link 214 was established (at step zero) whichever UE (UE1 101 or UE2 102) had initiated the steps for set up initially this UE takes full responsibility in initiating the KA requests as the KA initiator.

In an example, if UE1 101 initiated the direct link setup with UE2 102, the KA timers 232, 234 can be negotiated such that: timer 232 of UE1 101 is configured as "x" time units, and timer 234 of UE2 102 is configured as "x+y" time units. Thus, by expiration or close to expiry of x time units, UE1 101 communicates a KA request 250 over the PC5 unicast link 214. If UE2 102 obtains the KA requests, in response to this reception, it communicates a KA acknowledgement (ACK) 252. However, in case of a failure/failed condition where, for example, the KA request 250 never reaches UE2 102 within expiration of the timer 234 of UE2 102 (e.g., x+y time units), then UE2 102 is configured to communicate a KA request as the KA request initiator. In this case, when UE1 101 reaches a dead line, is out of service, or in some state where it could not send a KA request or reach UE2 102, UE2 102 can still recover/maintain the link 214 and send the KA request based to x+y time of its timer 234.

Y and x can be considered a different amount of time units (e.g., milliseconds, seconds, minutes, or other time unit), in which the KA timer 234 of UE 2 can be configured with amount of time units that is y time units greater than x time units. The KA timer 234 of UE2 102 can be configured as y times units or as a function that ensures that is KA timer 234 is greater than x, such as either as x+y or any amount greater than x. Alternatively, or additionally, y can be a same amount as x, but x+y an amount greater than x for configuring the KA timer 234 of UE2 for ensuring a recovery process, for example.

In particular, the KA timer 234 of UE2 102 can be negotiated at link setup via a PC5 signaling message or link setup signaling that it is configured for a greater time than the timer 232. As part of step 0, for example, when the V2X link is being setup as part of the PC5 signaling messages the time units x for timer 232 and the time units x+y for timer 234 could be an entity that could be negotiated or defined at this point. Thus, if UE1 101 initiates the direct link setup for the PC5 unicast link 214, then UE1 101 will be the KA initiator to provide a KA request at time unit x, and x could be any n period of time units, such as 1 s, 5 s, 10 ms, or any other set of n time units, for example.

Figure 3:
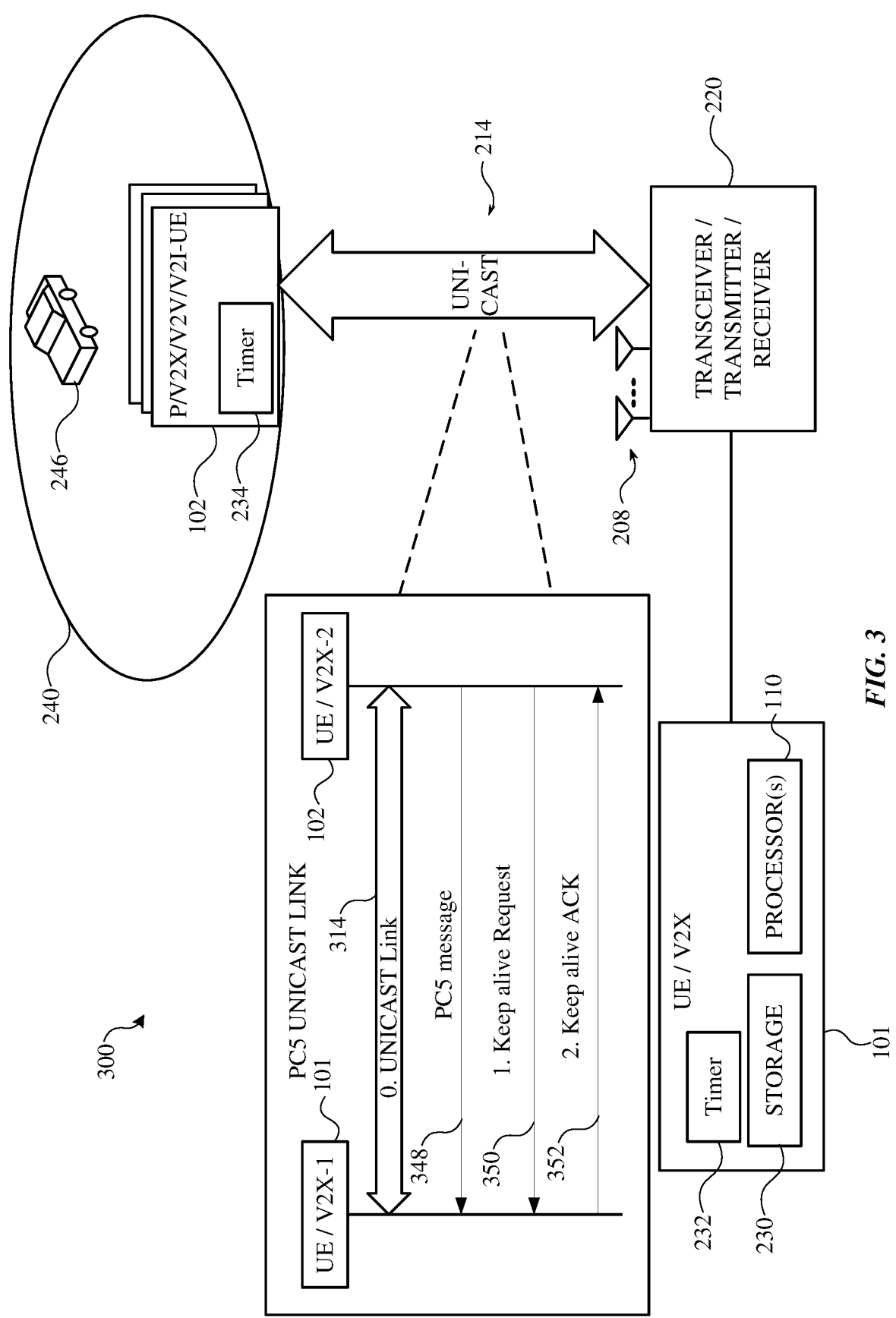
FIG. 3 is an example block diagram for processing direct peer-to-peer communications with at least one PC5 unicast link for a KA coordination scheme according to various embodiments described herein.

Referring to FIG. 3, illustrated is another example of a system 300 employable at UE/V2X 101, UE 102, or participating/peer entities 240 in direct peer-to-peer communication according to another KA coordination scheme. Similar to FIG. 2, the UE1 101 and the UE2 102 are configured to communicate via the PC5 unicast link 214 to perform a KA coordination scheme with a KA request 350 and a KA ACK 352 being sent over the PC5 unicast link 214 based on their corresponding KA timers 232 and 234.

In another embodiment, a KA initiator can be determined based on a dynamic decision making. Rather than the UE that initiated the link setup having the authority to initiate the KA requests over the PC5 unicast link 214 as a KA initiator, a last action on the PC5 unicast link 214 can determine the KA initiator (e.g., a transmission or a reception of a signal or message). For example, the UE (e.g., UE2 102) whose last action was a transmission of a PC5 message 348 can be designated/determined to be the KA initiator to provide the KA request 350 either ongoingly, unless a failure/failed condition occurs, or initially in the KA coordination scheme.

As part of the UE1 101 to UE2 102 communication there can be several PC5 messages 348 as either signaling or user traffic. If the last interaction (messaging) between the UEs was such that UE2 102 delivered or sent out a message to UE1 101, for example, before the Keep alive procedure, then UE2 102 as KA initiator can initiate a KA request 350 to the UE1 101. For example, the last action of UE2 102 could have been a Tx of a V2X PC5 message (either signaling or user traffic), while the last action of UE1 was a receipt (Rx) of a V2X message, UE2 102 can initiate the KA request 350 and UE1 101 can respond with a KA ACK 352 to indicate the link 214 is still active/alive. In this case, the timer 234 of UE2 102 could be configured as x to be 10 seconds and in this case of 10 seconds of inactivity over the link 214 UE2 102 could go ahead and initiate the mechanisms because as here whatever UE did the Tx as the last action it could initialize the KA request 350. While UE1 102 could have a timer configured as x+y time units as described in the embodiment of FIG. 2.

This could ensure co-ordination and make sure UE2 102 (i.e. the UE which had transmitted the last Tx message) will get opportunity to initiate the next KA message/request 350. This is useful in scenarios where either of the UEs (e.g., UE 2 in FIG. 3) as the Tx-UE has a higher max transmit power limit (MTPL), which means this UE (e.g., UE2 102) would have a better chance of transmitting at higher power, or where a UE has a better battery/better RF resources, so it can then take the load of initiating and transmitting the KA request 350. Alternatively, or additionally, the UE that has better RF resources, or better backhaul resources could also take the responsibility of the KA request whenever it came due, which could be sensed, broadcast or known to the UEs, either via the link 214 or otherwise.

The reverse of the UEs could also be true where the KA timers could be negotiated such that: •UE-1->"x" time units •UE-2->"x+y" time units, as one of ordinary skill in the art could appreciate in the example embodiments.

Figure 4:
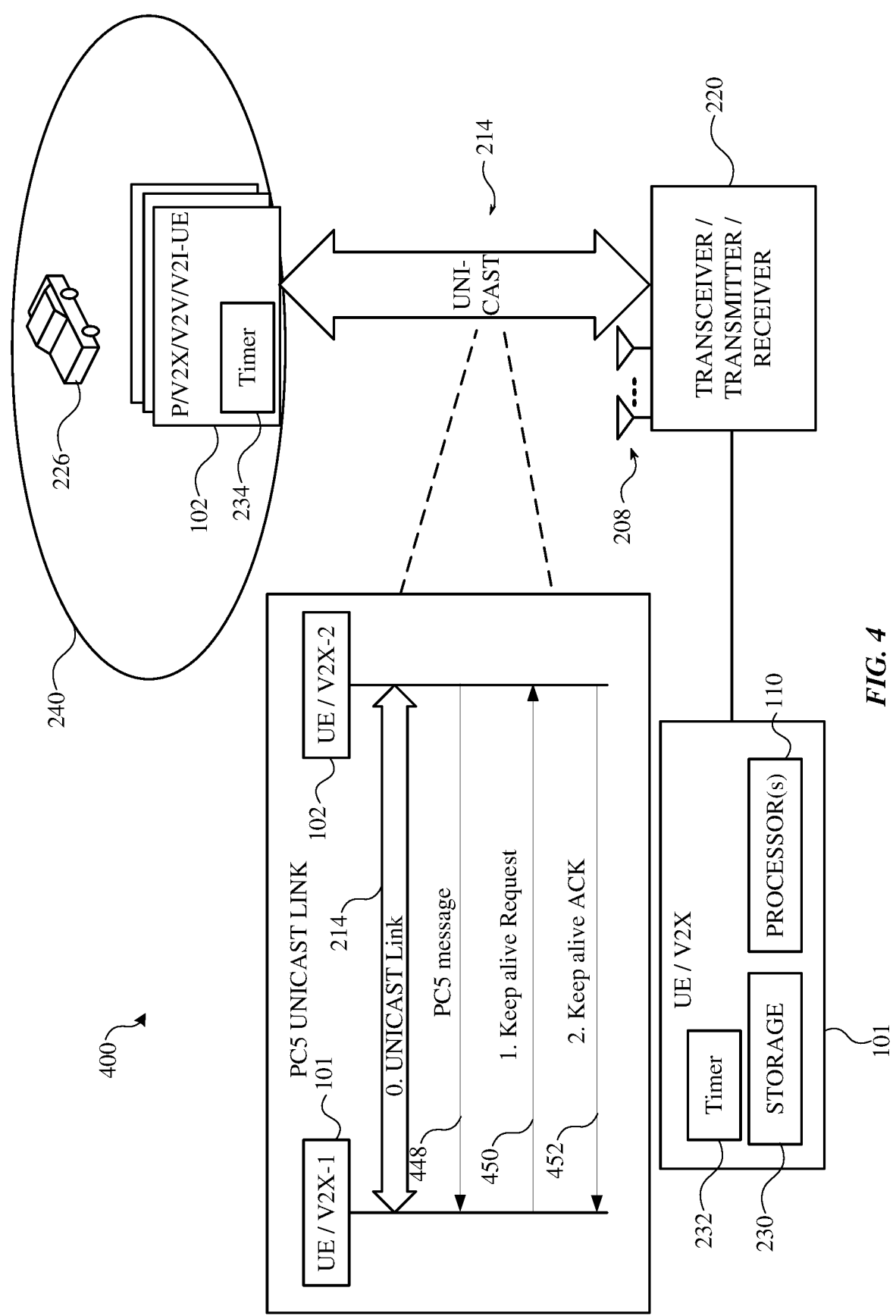
FIG. 4 is another example block diagram for processing direct peer-to-peer communications with at least one PC5 unicast link for a KA coordination scheme according to various embodiments described herein.

Referring to FIG. 4, illustrated is another example of a system 400 employable at UE/V2X 101, UE 102, or participating/peer entities 240 in direct peer-to-peer communication according to another KA coordination scheme. Alternatively, or additionally, the UE (e.g., UE1 101) whose last action was a reception of a PC5 message 448 could be designated as the KA initiator to provide/initiate the KA request(s) 450. In this embodiment, only the arrows at the KA request and at the KA ACK are reversed compare to FIG. 3. Because the PC5 message 448 is being received by the UE1 101 as illustrated as a last action being reception Rx over the link 214, UE1 101 would be the KA initiator sending the KA request 450 to UE2 102, and UE2 102 would respond with the KA ACK 452.

As such, before the Keep alive procedure, if the last action of UE1 101 or UE2 102 was a Rx of a V2X PC5 message 448 (either signaling or user traffic), this UE (e.g., UE1 101) would be negotiated to have its KA timer (e.g., timer 232) set to x, while the other UE's KA timer (e.g., timer 234 of UE2 102) set to x+y. This embodiment could ensure coordination and make sure the UE that had received the last PC5 unicast Rx message 448 would get opportunity to initiate the next Keep-alive message or KA request 450. This could be useful in scenarios to ensure fairness in Tx/Rx for the 2 UEs involved in V2V communication.

Figure 5:
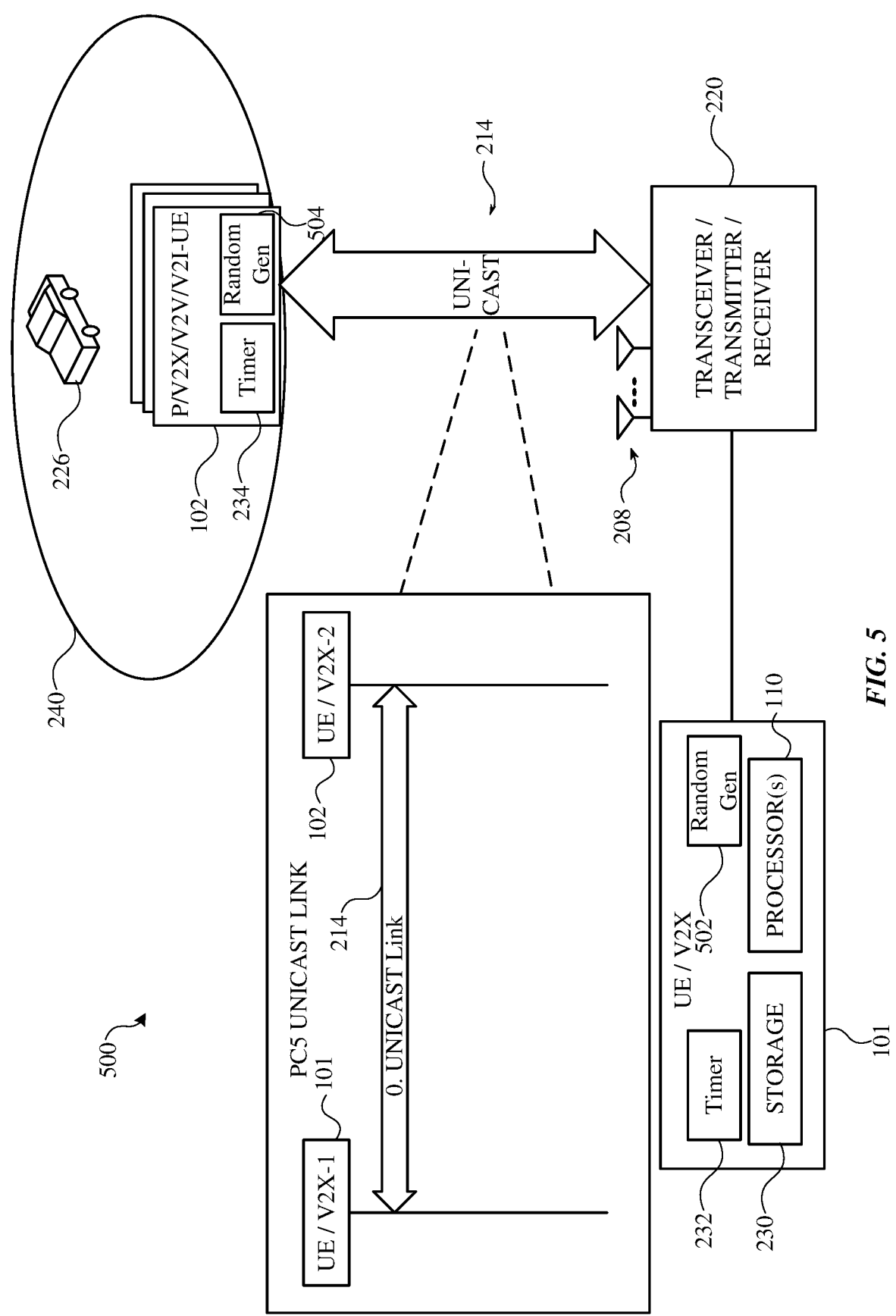
FIG. 5 is another example block diagram for processing direct peer-to-peer communications with at least one PC5 unicast link for a KA coordination scheme according to various embodiments described herein.

FIG. 5 illustrates an example is another example of a system 500 employable at UE/V2X 101, UE 102, or participating/peer entities 240 in direct peer-to-peer communication according to another KA coordination scheme. The KA coordination scheme includes configuration of a random number by random number generator 502 and 504 as part of UE1 101 and UE2 102, respectively.

In this embodiment, the KA coordination scheme includes adding or subtracting a random jitter to the KA timer values of KA timer 232 and 234. As described above, the same KA timer value can either be negotiated or configured as the time T, and once this is known, each UE (UE1 101, UE2 102) can generate and add a random number to the KA timer value T for KA timers 232 and 234. The random number generators 502 and 504 can be configured to generate a random number and provide this value for addition or subtraction in order to determine when each UE1 101 and UE2 102 operates to initiate or provide a KA request. Because the random number is expected to be truly random it is highly likely (greater than 99%) as chosen by UE1 101 and UE2 102 to be different from one another. If the base timer value is T time units, for example, each UE adds (plus or minus) the random number to the timer value of its timer (KA timer 232, 234) as a T+/−random number. This can further ensure that the KA timers 232 and 234 are not colliding, and one of the UEs will have a shot at a KA request while the other will have a longer KA timer via a random number generation bias by random jitter added to their keep alive timer value. Furthermore, UE1 101 and UE2 102 may keep re-generating new random number after each keep alive procedure.

Figure 6:
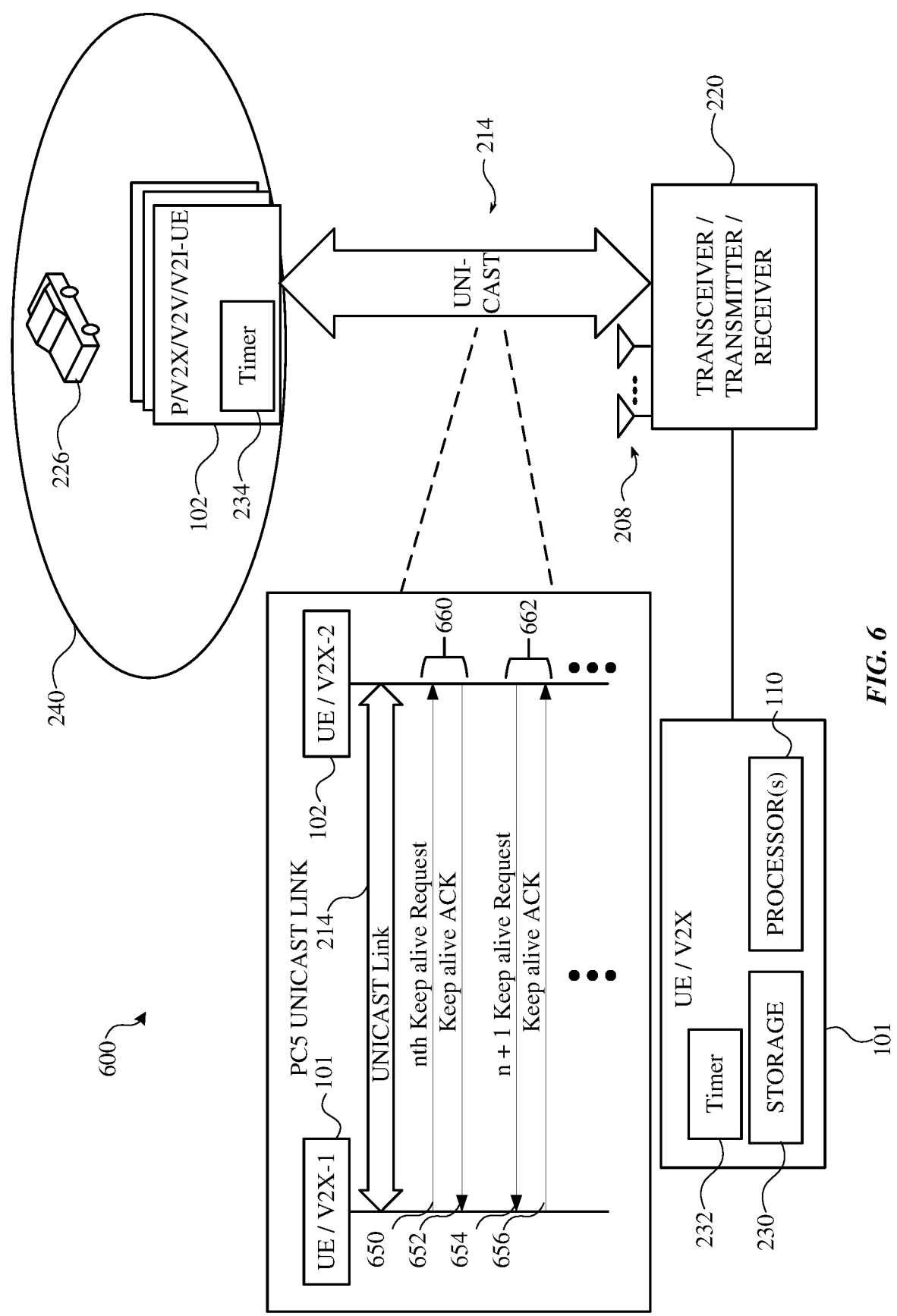
FIG. 6 is another example block diagram for processing direct peer-to-peer communications with at least one PC5 unicast link for a KA coordination scheme according to various embodiments described herein.

FIG. 6 illustrates an example is another example of a system 600 employable at UE/V2X 101, UE 102, or participating/peer entities 240 in direct peer-to-peer communication according to another KA coordination scheme that comprises a round robin KA scheme for V2V UEs or other UEs communicatively coupled via the PC5 unicast link 214. This KA coordination scheme comprises a KA initiator being selected in a round robin mechanism.

For example, if a current KA request 650 (e.g., n-th request) was initiated by UE1 101 and was sent to UE2 102, for example, then the keep alive timers 232 and 234 for the next KA procedure (n+1 request) can be configured to be set such that: •UE-1->"x+y" time units •UE-2->"x" time units. The request n can be any KA request within a sequence of KA requests over the PC5 unicast link between UE1 101 and UE2 102. Thus, for each round (e.g., first round 660, second round 662, and so on) the timer values can be flip-flopped, where, for example, the timer value for the timer 232 of UE1 101 is the longer duration (e.g., x+y) in one round (e.g., round 660) and then the timer value for the timer 234 of UE2 102 the longer duration (e.g., x+y) in the next, and so on for the duration of time that the link 214 between the UEs is active. This can ensure co-ordination and make sure both UEs (e.g., UE2 as the UE which received the previous keep-alive request) can have opportunity to initiate transmission of the next KA message/request 654, and so on in a round robin mechanism.

KA operations at each UE can operate when there is a period of inactivity on the link 214 in order to determine whether to keep the link 214 active or not. The timers 232 and 234 of each UE initiate, and if the timer (e.g., 232 of UE1 101) with a shorter timer value (e.g., x) expires first, then a KA request 650 is communicated over the link 214. In response, the receiving UE (e.g., UE2 102) sends a KA ACK 652. This interaction can be what is referred to as a round (e.g., round 660 or 662). However, if the timer value (x+y) of timer 234 of UE2 102 expires first without receiving a KA request 650, for example, then instead of sending a KA ACK, a KA request is communicated, which could be a result of a failed/failure condition. A failure condition can result from the link 214 being inactive, a failure in transmission by UE1 101, or other resources not enabling the KA request 650 to reach UE2 102 before the expire of the longer duration timer (e.g., x+y).

In response to receiving a KA request 654 from UE2 102, either because UE2 102 was the last to communicate the KA ACK 652, for example, or because the expiry of the timer value (x+y) of timer 234, UE2 102 then communicates the KA request 656 as part a different round 662 in the round robin mechanism of operation. In each subsequent round 660, the timer values would be switched with UE1 101 now configuring timer 232 with x+y and UE2 102 configure timer 234 with x. This flip-flop of a longer timer duration and a short timer duration between the two UEs at each round can be initiated at the transmission/receipt of a KA ACK or when a KA request is made after an expiry of the longer timer (x+y). As long as conditions of the PC5 unicast link 214 are active, the longer timer should not expire. In a good case what can happen is the UE that is configured with the timer x for a given round (e.g., 660, 662) expires first and initiates the KA request. The KA ACK is then sent by the receiving UE and at the time that the KA ACK is sent automatically that UE is going to stop the longer timer of (x+y). At each subsequent round (e.g., N+2, and so on) the timer values can be reversed/flip-flopped so that the next UE, now designated as the KA initiator, configures its timer with x, while the other UE configures its timer with the longer duration of x+y, for example.

The round robin mechanism in the KA coordination scheme can useful, for example, to ensure fairness in Tx/Rx for the 2 UEs involved in V2V communication, or direct peer-to-peer communication, and KA requests/ACKs are being exchanged rather than other traffic, for example.

Figure 7:
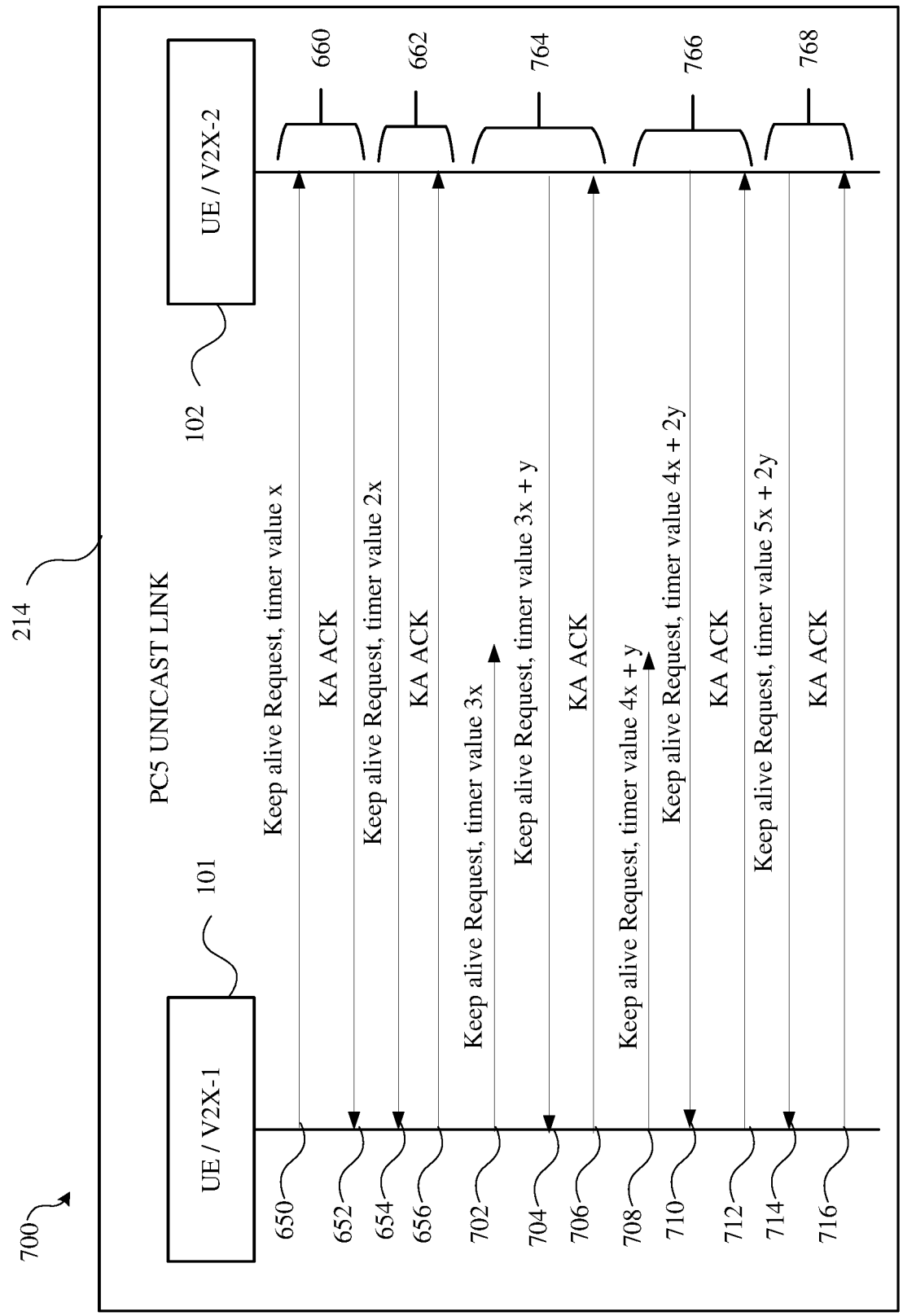
FIG. 7 is another example block diagram for processing direct peer-to-peer communications with at least one PC5 unicast link for a KA coordination scheme according to various embodiments described herein.

FIG. 7 illustrates another example of a communication flow in a KA coordination scheme 700 employable at UE/V2X 101, UE 102, or participating/peer entities 240 in direct peer-to-peer communication according to various embodiments over the PC5 unicast link 214. Building upon the KA coordination scheme that comprises a round robin KA scheme of FIG. 6, FIG. 7 illustrates a communication flow for a failure condition and demonstrates a failure mechanism that the UEs can initiate or configured with their corresponding timers 232 and 234, for example.

The KA coordination scheme 700 takes into account failure case handling, where, for example, no KA request is received by expiration of the longer timer value (e.g., x+y), and the UE with the longer timer at this round initiates the KA request in response to the timer expiration. In this case, when a UE reaches a dead line, is out of service, or in some state where it could not send a KA request or reach the other peer UE with the KA request, the peer UE can still recover/maintain the link 214 by sending the KA request based on the time duration of x+y expiring. In response, to receiving the KA request from the other peer UE, the UE that initially attempted to send the KA request that failed, responds with a KA ACK within this round. If a failed condition or a KA request fails to reach the other peer UE at least two rounds consecutively, then the UE other that is successfully communicating KA requests can assume the role of KA initiator going forward for sending the KA requests. As such, there is an implied acceptance by both UEs that one UE is only able to get KA acknowledges successfully via the PC5 unicast link 214 and not KA requests. The KA acknowledgements can be smaller in size that the KA requests and require less power or resources for transfer over the PC5 unicast link 214.

For example, the first two rounds 660 and 662 of the round robin scheme can be similar to the KA communications of FIG. 6, where UE1 101 can initiates KA procedure at 'x' configured as the timer value at timer 232 in the first round 660, and then UE-2 initiates the next KA procedure at 2*x as the timer value at timer 234 in the next round 662. Y can be an amount equal to or less than x, for example. Likewise, a KA ACK 652 is communicated by UE2 102 in response to the KA request 650, and a KA ACK 656 communicated by UE1 101 in response to the KA request 654.

A failure condition occurs with the KA request 702 sent by UE1 101, for example. Here, the KA request 702 fails to reach UE2 102 by the expiration of its timer expiration of 3x+y. In response to the expiration of its timer 234, UE2 102 sends a KA request 704 as the KA initiator for this round 764. Here, UE2's timer 234 will expire because the peer UE can always start the timer at an offset of y. If UE1 101, for example, has started at 3x, then UE2 102 will start at 3x+y. So here UE2 102 realizes it not get a KA request so it will initiate the KA request 704. In response to receiving the KA request 704, UE1 101 responds with the KA ACK 706 as part of the round 764, for example.

Because UE2 102 actually sent this KA request 708 here as part of the round robin mechanism in round 764, the next KA request 708 will be initiated by UE1 101 at 4x+y. Another round 766 begins with the KA initiator for the round (e.g., UE1 101) communicating the KA request 708. However, once again for a second consecutive round (e.g., round 766) as KA initiator, UE1 101 fails to communicate a KA request (e.g., KA request 708) to its peer, UE2 102, via the PC5 unicast link 214. Then UE2 102 sends a KA request 710 at the expiry of its timer value 4x+2y, thereby taking the responsibility of initiating the KA request 710 for a second consecutive fail in a round by its peer UE1 101. In response to receiving the KA request 710, UE1 101 responds with a KA ACK 712.

At this point in the KA coordination scheme via the PC5 unicast link 214, a fail-safe mechanism becomes activated in response to at least two consecutive failures among the rounds, where UE1's KA request did not reach UE2 102. Consequently, UE1 101 is struggling to initiate uplink messages comprising the KA requests. However, UE1 101 is successful in sending KA ACKs. This can mean that UE1 101 could have a problem sending a larger message because the KA request is expected to slightly bigger than the KA ACKs, which may be from having a higher data content, and the ACK is expected to be smaller. Thus, after n consecutive failures (e.g., two or more rounds) as the KA initiator, UE2 102 assumes a permanent role as KA initiator for the PC5 unicast link 214, thereby alleviating the burden of UE1 101 to further attempt KA requests over the link 214 and save resources for a time being or duration of the link 214, for example. In other words, UE2 102 takes the decision that it further initiates all future KA requests.

In an aspect, UE1 101 can further be communicated this decision for UE2 102 to take the permanent role as KA initiator because it may not know that UE2 102 has taken this decision. This communication of a permanent KA initiator can be done in different manners. For example, an explicit communication can be done via the KA request in an extra field or as an extra/reserved bit(s), or implicitly by another means in the KA message/request, for example. This field or entry can, for example, serve to indicate which entity is going to initiate the next KA request, or the next few KA requests, or for the life of activation of the link 214. Alternatively, an explicit communication can be done as part of a direct link modification procedure. Now UE1 101, for example, no longer initiates future KA requests in subsequent rounds such as in 768, where, for example, a KA request 714 is communicated by UE2 102 as the permanent KA initiator. UE1 101 then can saves resources by only responding, such as with the KA ACK 716 in round 768, for example.

Although the failure mechanism is demonstrated with the round robin KA coordination scheme, this failure mechanism can be applicable to any of the other embodiments of KA coordination schemes also, and not limited to round robin mechanism of KA coordination as first introduced in FIG. 6 above.

Figure 8:
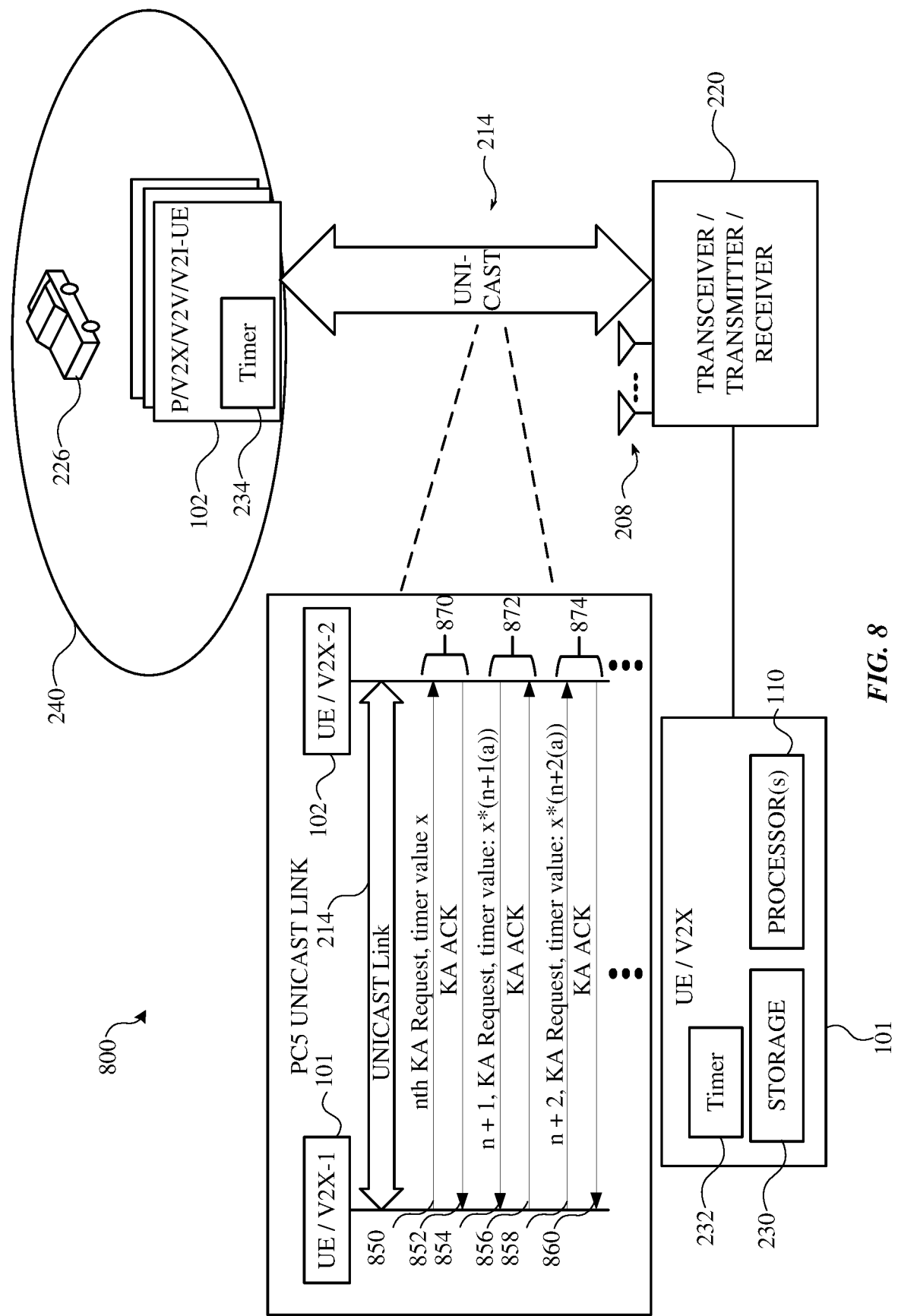
FIG. 8 is another example block diagram for processing direct peer-to-peer communications with at least one PC5 unicast link for a KA coordination scheme according to various embodiments described herein.

FIG. 8 illustrates another example of a communication flow in a KA coordination scheme 700 employable at UE/V2X 101, UE 102, or participating/peer entities 240 in direct peer-to-peer communication according to various embodiments over the PC5 unicast link 214. Building upon the KA coordination scheme that comprises a round robin KA scheme of FIG. 6, FIG. 8 illustrates an embodiment where a round robin telescopic timer can be configured at the timers 232 and 234 at each round of PC5 unicast link communications.

Here, UE1 101 and UE2 102 can configure a telescopic timer mechanism where the keep alive initiator is chosen in a round robin manner, but each subsequent round can configure a larger base interval/KA interval of time that telescopes or is extending at each round farther beyond an initial shorter time value of x as a telescopic or telescoping interval of time units. The time value (base interval) of the KA initiator can be a shorter time interval among the peer devices communicatively coupled via the PC5 unicast link 214 as well.

For example, if the current KA request 850 (e.g. n-th request at round 870) was initiated by UE1 101 and was sent to UE2 102, which responds with the KA ACK 852, then the keep alive timers 232 and 234 for the next KA procedure round (n+1(a) request 856 at round 872) can be set such that: UE1 101's timer value is configured according to: (x*(n+1(a)))+y time units, and UE2 102's timer value is configured according to: (x*(n+1(a))) time units. As such, the index of each round n+1, n+2, etc. can be utilized as the telescopic interval or time by which to extend the base interval of each KA initiator's timer, either timer 232 or timer 234 of corresponding UE devices. Alternatively, or additionally, an alpha (a) could be, or not be, further utilized at each round that could also further extend or adjust the weight of the current index for a given round, for example. Alpha could be any function, variable or constant, for example.

Subsequently, for (n+2) request 860 at round 874, the keep-alive timers 232 and 234 can be set such that: •UE-1->"(x*(n+2(a)))" time units •UE-2->"(x*(n+2(a)))+y" time units. Each KA request 850, 854, 858 are also responded to accordingly by corresponding KA ACK messages 852, 856, and 860.

The telescopic round robin mechanism can further operate to ensure co-ordination and make sure that the UE which received the previous keep-alive request will get opportunity to initiate transmission of the next Keep-alive message as KA initiator. Additionally, or alternatively, this mechanism can keep increasing the keep alive interval based on an attempt count, or an attempt to send a KA requests.

In another embodiment, the telescopic interval can be a different base interval/KA interval upon which the timers 232 and 234 are configured. For example, each of the timers 232 and 234 can include a periodic timer for every 10 seconds. A second timer can be configured as a telescopic timer, where the timer is configured for 10 seconds at the first round and if that is successful the next round is after 20 seconds, and then 70 seconds, and the next after 150 seconds, and so on, for example. Thus, the interval increase can also be based on a successful reception of one or more KA requests.

Figure 9:
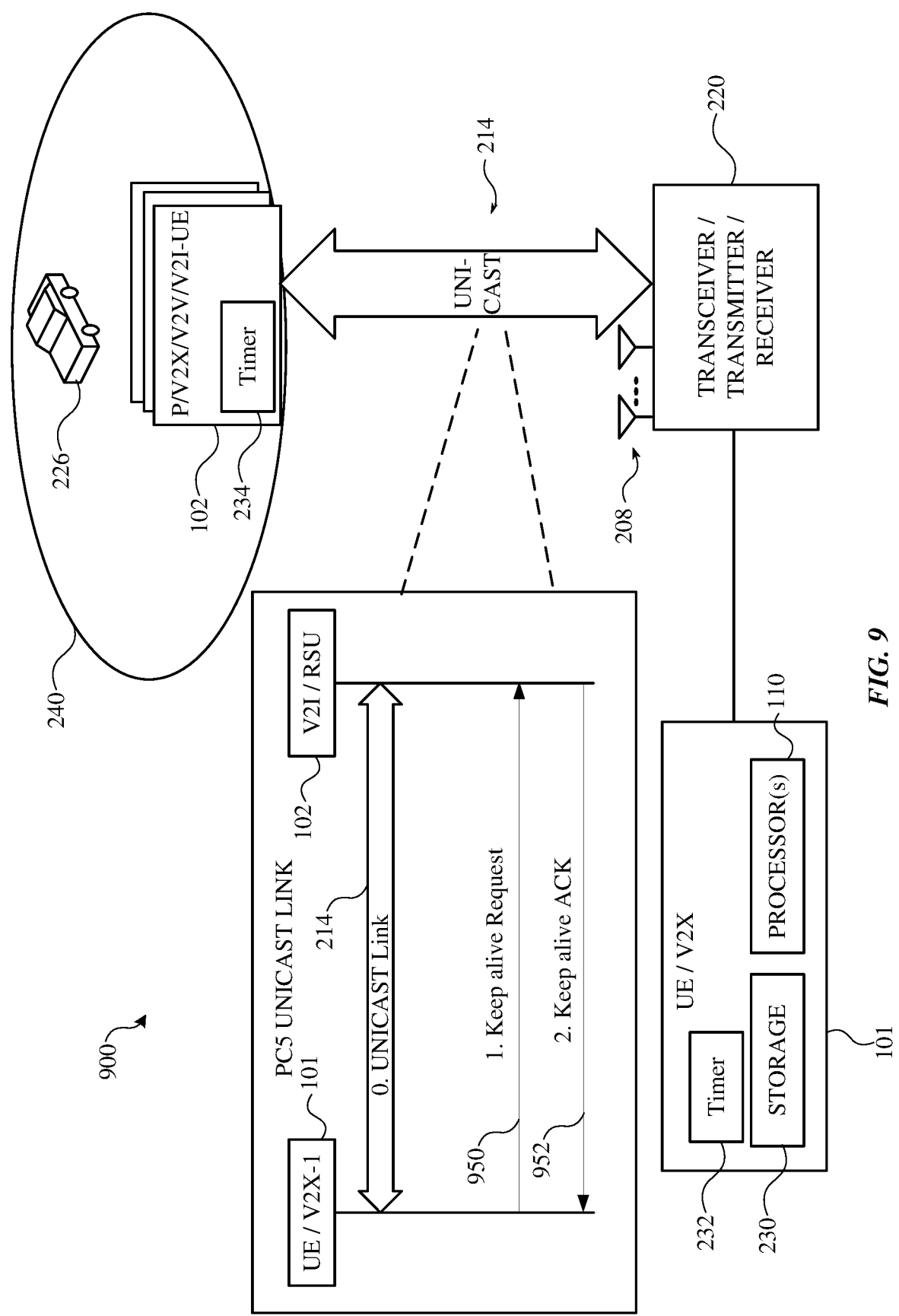
FIG. 9 is another example block diagram for processing direct peer-to-peer communications with at least one PC5 unicast link for a KA coordination scheme according to various embodiments described herein.

FIG. 9 illustrates another example of a communication flow in a KA coordination scheme 900 employable at UE/V2X 101, UE 102, or participating/peer entities 240 in direct peer-to-peer communication according to various embodiments. Here, UE2 102 can be a V2I or a road side unit (RSU) for example.

In an embodiment, for PC5, the RSU 102 could be connected to a power source, basically the infrastructure. Thus, the UE1 101 and RSU 102 can include a mechanism as part of the KA coordination scheme via the PC5 unicast link 214 to make sure that the RSU is always the KA initiator to initiate transmission of the KA requests (e.g., KA requests 950), where the UE1 101 responds only with KA ACKs 952.

To generalize, in a V2X unicast PC5 link, if one entity 240 (e.g., a cellular device or the like) that is connected to power source, as compared to a battery or related device, while other peer is not connected, then the UE which is connected to power source shall take the responsibility of initiating the KA requests 950 and not necessarily based on one peer being an RSU or V2I device, for example. This can be achieved by the power source connected UE having a lower keep alive timer 232, as compared to the peer UE timer 234, for vice versa. The type of device or the connection with a power source could be communicated or predefined also, for example.

FIG. 10 illustrates another example of a communication flow in a KA coordination scheme 1000 employable at UE/V2X 101, UE 102, or participating/peer entities 240 in direct peer-to-peer communication according to various embodiments. The UE1 101 can further include an implicit KA ACK timer 1002, and the UE2 102 can include an implicit KA ACK timer 1004.

In embodiment, instead of just a KA request 1050 from UE1 101 being responded back with a KA ack from UE2 102 only, or vice versa, UE2 102 could communicate a signal or message (e.g., PC5 message 1052) in its queue or storage 230, if queued therein, instead of the KA ACK. Thus, instead of a KA ACK, if UE2 102, for example, sends out some valid PC5 signaling or traffic message after receiving KA request 1050, but before sending out KA ACK it could be considered as an implicit KA ACK to UE1 101. UE1 101 could consider the link 214 to still be active. Furthermore, UE-1 would not expect an explicit KA ACK.

The implicit KA ACK timers 1002 and 1004 can be set to be reduce redundant KA ACKs, and can be started at UE2 102 (or the receiving UE of a KA request) once UE2 102 receives KA request 1050 from UE1 101, and hold off from sending a KA ACK before expiry of the timer 234. Further, UE2 102 can send a KA ACK when implicit KA ACK timer 1004 expires. However, before expiry of the implicit KA ACK timer 1004, if there is any valid PC5 signaling or user traffic message to be sent from UE2 102 to UE1 101, UE2 102 can stop the implicit KA ACK timers 1004 and send out the valid PC5 message, not sending a KA ACK.

At least one benefit of the KA coordination scheme 1000 can be to give an opportunity to reduce the need to send KA ACKs if there is any pending valid PC5 traffic which was anyways going to be sent out, giving an opportunity for the valid traffic to go out as well serve the purpose of an implicit KA ACK.

Figure 11:
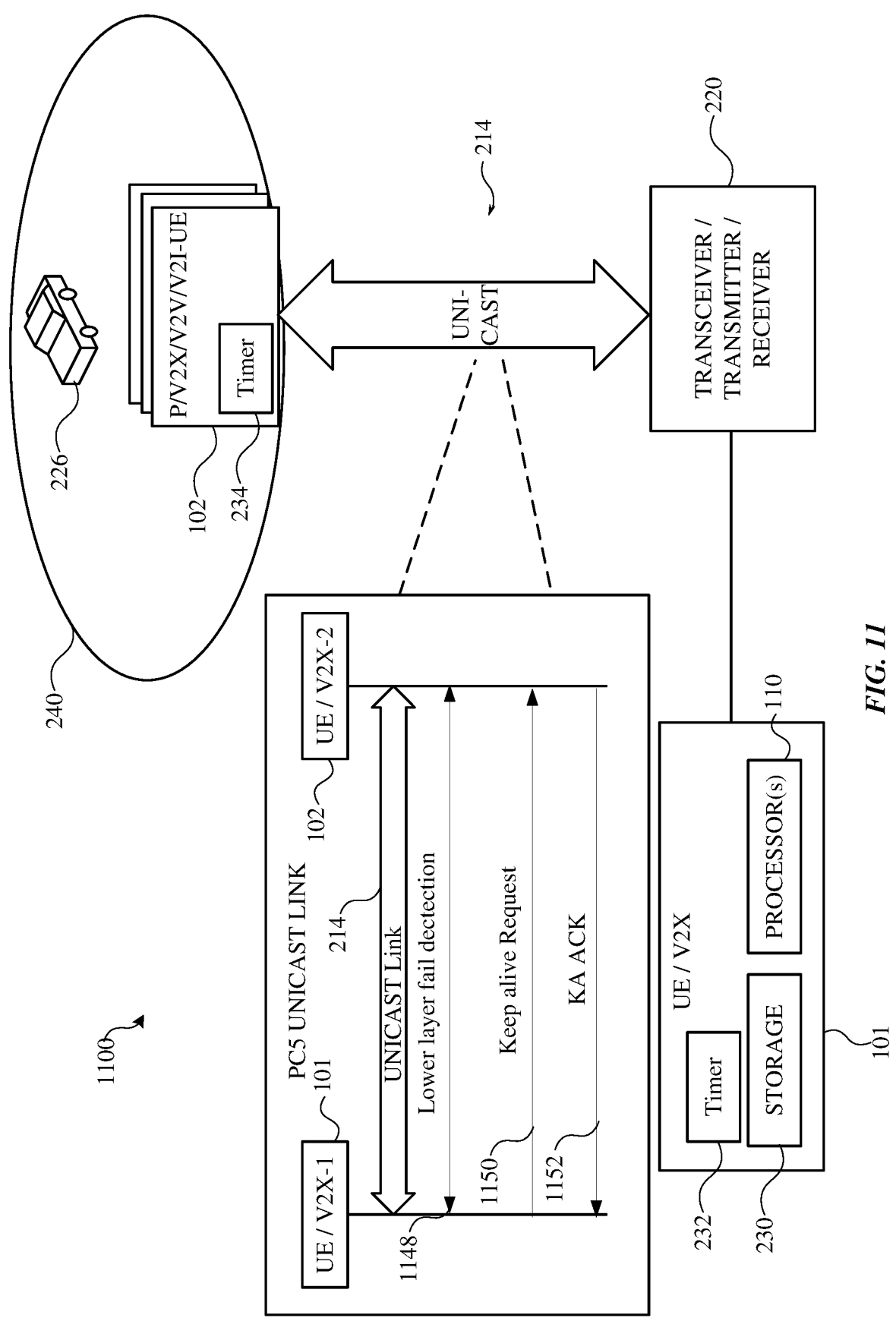
FIG. 11 is another example block diagram for processing direct peer-to-peer communications with at least one PC5 unicast link for a KA coordination scheme according to various embodiments described herein.

Referring to FIG. 11, is another example of a communication flow in a KA coordination scheme 1100 employable at UE/V2X 101, UE 102, or participating/peer entities 240 in direct peer-to-peer communication according to various embodiments.

In one embodiment, a KA request can be initiated in response to one or more triggers in addition to or alternatively to inactivity. A trigger can be, for example, a lower layer fail detection (e.g., a link layer of a protocol stack or lower layer including the PHY layer). For example, any kind of link layer, or layer 1, physical layer issues (e.g., a high level or threshold being satisfied of block error rate (BLER), or error rate at layer 1 or lower layer detection 1148 failure, a low signal strength, power measure/level falling below a threshold or otherwise satisfying a threshold, or very low signal strength below a threshold, or other such lower layer fail detection. In response to the detection 1148, by either UE1 101 or UE2 102, the KA request 1150 could be initiated. This can provide a proactive mechanism for initiating the KA request 1150 in addition to or alternatively to a timer expiry of the timer values x or x+y, for example, in order to keep the PC5 unicast link 214 alive/active.

In the example of FIG. 11, UE1 101 can detect a link failure or a signal measurement that drops below or satisfying a threshold measure of the PC5 unicast link 214 strength at 1148. The UE1 101 can then be triggered to provide the KA request 1150. In response to the KA request 1150, the UE2 102 responds with the KA ACK 1152. In this case, the UE1 101 receives the KA ACK 1152, UE1 101 can ascertain that although the link 214 may be poor, it still retains the communication link as valid with its peer UE2 102. However, if the peer UE2 102 does not respond, there can still be a proactive mechanism that does not need to wait for an expire of the timer mechanism 232 for whatever time units it may be configured for by way of an additional trigger mechanism. This way, UEs in direct peer-to-peer communication via the PC5 unicast link 214 can proactively consider or gauge a proactive viability of that link, and a UE can proactively consider that the link is down when a keep alive procedure does not get a successful ACK. Conversely, if the KA request does obtain a successful KA ACK, the UE can consider the PC5 unicast link to still be valid, and not disconnect the link based on the detection 1148 itself and sending the KA request or receiving a KA request, for example.

Figure 12:
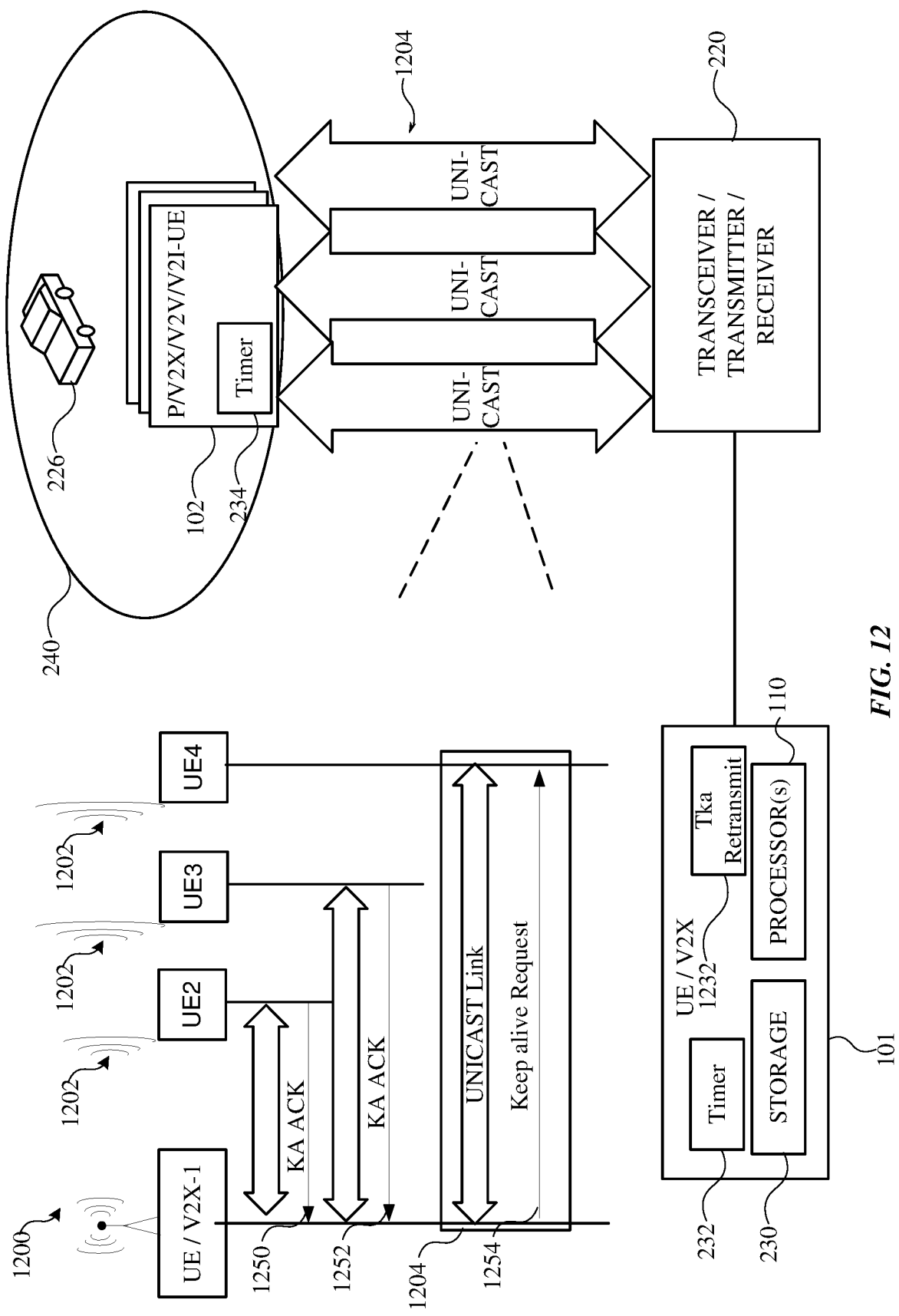
FIG. 12 is another example block diagram for processing direct peer-to-peer communications with at least one PC5 unicast link for a KA coordination scheme according to various embodiments described herein.

Referring to FIG. 12, is another example of a communication flow in a KA coordination scheme 1100 employable at participating/peer entities 240 (e.g., UE2, UE3 and UE4) in direct peer-to-peer communication according to various embodiments. The KA coordination scheme can include multiple peer entities 240 as UE2, UE3 and UE4 each with PC5 unicast links 1204 connected to the UE1 101 for PC5 messaging. In various scenarios, UE1 101 could be have multiple connections, especially in commercial V2X deployments, where it is possible that there are multiple PC5 unicast links active (e.g., UE1 to UE2, UE1 to UE3, UE1 to UE4, etc.).

It may be a large amount of signaling if UE1 101 individually initiates unicast KA requests with each peer entity (UE2, UE3 and UE4). Thus, in such scenarios, instead of sending several unicast KA requests, a "single Broadcast" Keep alive" request/message 1202 could be generated via broadcast messaging. It could be either broadcast or multicast, for example, as a single message to all UEs with PC5 unicasts links to the UE1 101. The single broadcast/multicast message could be sent by UE1 101 when the keep alive timer 232 expires, or is about to expire for multiple PC5 unicast links. Thus, instead of sending individual messages to each UE, UE1 101 could just send a broadcast keep alive or a multicast keep alive or a groupcast keep alive as a single message, but sent to all the UEs within the PC5 vicinity or that have PC5 unicast link 1204 with UE1 101.

Based on reception of the broadcast/multicast/groupcast keep alive request 1202 from UE1 101, the peer UEs (UE2, UE3 and UE4) can then decide to respond back with unicast KA ACK (e.g., 1250, 1252, 1254) back to UE1 101 for UE-1 to know which of the UEs (UE2, UE3 and UE4) have active PC5 unicast links 1204. For example, UE1 101 can send the broadcast 1202 out and only UE2 and UE3 respond back with KA ACKs 1250 and 1252. Then the UE1 101 can know that the UE1 to UE4 PC5 unicast link is broken and take a mitigation measure or re-establish the link 1204 with UE4.

In an embodiment, for the case where the broadcast message 1202 gets lost, and does not reach the destination (e.g., UE4), a timer called T keep alive re-transmit or "Tkaretransmit" 1232 can be configured. Here, if UE1 101 does not receive keep alive-ack till Tka-retransmit timer expiry, UE1 will resend keep alive request as a unicast message to each individual peer UE, or to the UE it does not receive a KA ACK from as a result of the broadcast KA request 1202. For example, if UE1 101 sends broadcast to UE-2-3-4 and only UE 2 and 3 respond with KA ACKs 1250 and 1252 (via corresponding PC5 unicast links 1204), and then the timer Tkaretransmit expires at UE1 101 at that time UE1 101 can try to resend a keep alive request in a unicast 1204 for a request to UE-4, over its corresponding individual PC5 unicast link. Then if UE-4 still does not respond then it will then try to re-establish or tear down the link. However, if UE4 does receive the KA request 1254 over its PC5 unicast link with UE1 101 as an independent unicast link 1204, then the it can respond with a KA ACK (not show) via the unicast link 1204 to remain active in the direct peer-to-peer communications with its peer UE1 101.

Broadcast V2X messages 1202 at the layer 2 can be sent over radio link control (RLC) unacknowledged mode (UM), while unicast V2X messages can be sent over RLC acknowledged mode (AM). This means is that in the AM an Ack/Nack can be communicated at the layer 2 link layer, not at the keep alive layer necessarily. However, this is where the broadcast message may not reach the destination and even the source of the KA request may not know about it because there is no ACK. Thus, there is a chance that the broadcast message may not reach the destination, such as with UE4. In this case, where the Broadcast keep alive message 1202 reaches a peer UE, which is the good case, then the KA ACK will be received by UE1 since the KA ACK is still received over RLC-AM because the ACK can come over air. For the case where the broadcast message 1202 gets lost, and does not reach the destination, as such the timer 1232 is specifically configured for the broadcast 1202. Here, if UE1 does not receive a KA ACK till Tka-retransmit timer expiry, UE1 101 can resend one or more KA requests as a unicast message to each individual peer UE over each individual PC5 unicast link 1204 thereat, or only to the peer not responding in response to the broadcast KA request.

Alternatively, or additionally, instead of communicating a KA ACK in response to receiving the broadcast KA request 1202 over the corresponding PC5 unicast link 1204, UE2, UE3, or UE4 can decide to broadcast or multicast or groupcast a KA ACK. Thus, the UEs communicate KA messages including a KA request, a KA ACK, or both either by unicast or broadcast. For example, in response to UE2 and UE3 receiving the KA request 1202, each of them could decide to broadcast a KA ACK as an Alive message, for example (e.g., "I am alive"), or send a KA ACK over their respective unicast link, and based on the receipt I am alive indication from UE-2, the UE-1 can consider that the UE-1 to UE2 PC5 link is active, for example.

Based on reception of the broadcast keep alive request 1202 from UE-1-UE2, UE3 and UE4 may choose to either respond back with unicast KA ACK back to UE-A, or UE2, UE3, UE4 may also in turn decide to broadcast "I am alive" indication. Based on the received "I am alive" broadcast indication from UE-2, UE-1 can consider the UE-1 to UE-2 PC5 link to be active. This mechanism helps reduce the amount of PC5 maintenance messages needed by intelligently leveraging broadcast functionality in the KA coordination schemes described herein.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases. Reference may be made to the figures described above for ease of description. However, the methods are not limited to any particular embodiment or example provided within this disclosure and can be applied to any of the systems disclosed herein.

Figure 13:
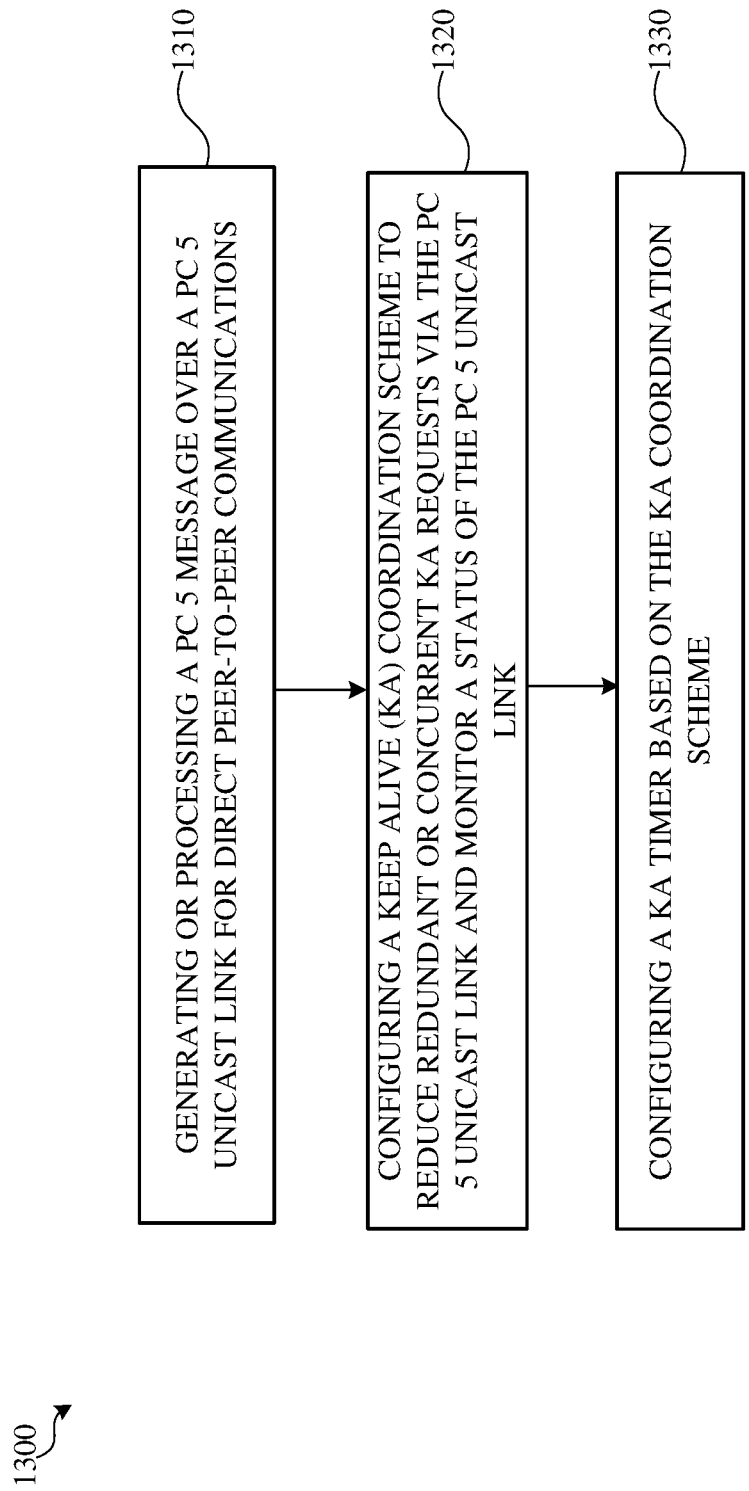
FIG. 13 is a block diagram illustrating an example process flow for configuring direct peer-to-peer communications with at least one PC5 unicast link for a KA coordination scheme according to various embodiments described herein.

Referring to FIG. 13, illustrated is an example process flow 1300 for a network device or component (e.g., UE 101, or other network component) to perform operations for direct peer-to-peer communications among UE peer devices.

At 1310, the process flow 1300 initiates with generating or processing a PC5 message over a PC5 unicast link for direct peer-to-peer communications.

At 1320, the process flow 1300 further comprises configuring a keep alive (KA) coordination scheme to reduce redundant or concurrent KA requests via the PC5 unicast link and monitor a status of the PC5 unicast link.

At 1330, the process flow 1300 comprises configuring a KA timer based on the KA coordination scheme.

In another embodiment, the process flow can include establishing a direct link set-up of the PC5 unicast link via the PC5 message. A KA request initiator can be configured to provide one or more KA requests over the PC5 unicast link based on having initiated establishment of the PC5 unicast link.

Alternatively, or additionally, a first KA request can be provided within a number of x time units of the KA timer in response to being a last device to transmit or receive the PC5 message over the PC5 unicast link. The process flow can include receiving a KA acknowledgement (ACK) in response to the KA request or receiving a second KA request in response to an expiration of a number of y time units greater than a number of x time units associated with another KA timer of a peer UE of the PC5 unicast link.

In another embodiment, the process flow can include providing a KA request via the PC5 unicast link based on a trigger comprising at least one of: an expiration of the KA timer, or a detection of a failure related to an access stratum/link layer or a lower layer of a protocol stack, wherein the failure comprises satisfying a threshold of at least one of: a block error rate (BLER), a noise level, a signal power, or a link parameter.

In another embodiment, the process flow can include broadcasting or multicasting a KA request in response to a plurality of PC5 unicast links being active and receiving one or more KA ACKs via one or more PC5 unicast links of the plurality of PC5 unicast links based on the broadcast KA request. Embodiments can further include resending the KA request via at least one PC5 unicast link of the plurality of PC5 unicast links in response to a T-KA-retransmit timer expiring before receiving a KA ACK from the at least one PC5 unicast link of the plurality of PC5 unicast links.

Alternatively, or additionally, the process flow can include broadcasting a broadcast KA request in response to a plurality of PC5 unicast links being active, or communicating a plurality of KA requests independently over the plurality PC5 unicast links, respectively. The process flow can further include receiving one or more KA ACKs via one or more PC5 unicast links of the plurality of PC5 unicast links based on the broadcast KA request or the plurality of KA requests, or receiving the one or more an alive indications in one or more broadcast messages based on the broadcast KA request or the plurality of KA requests.

Figure 14:
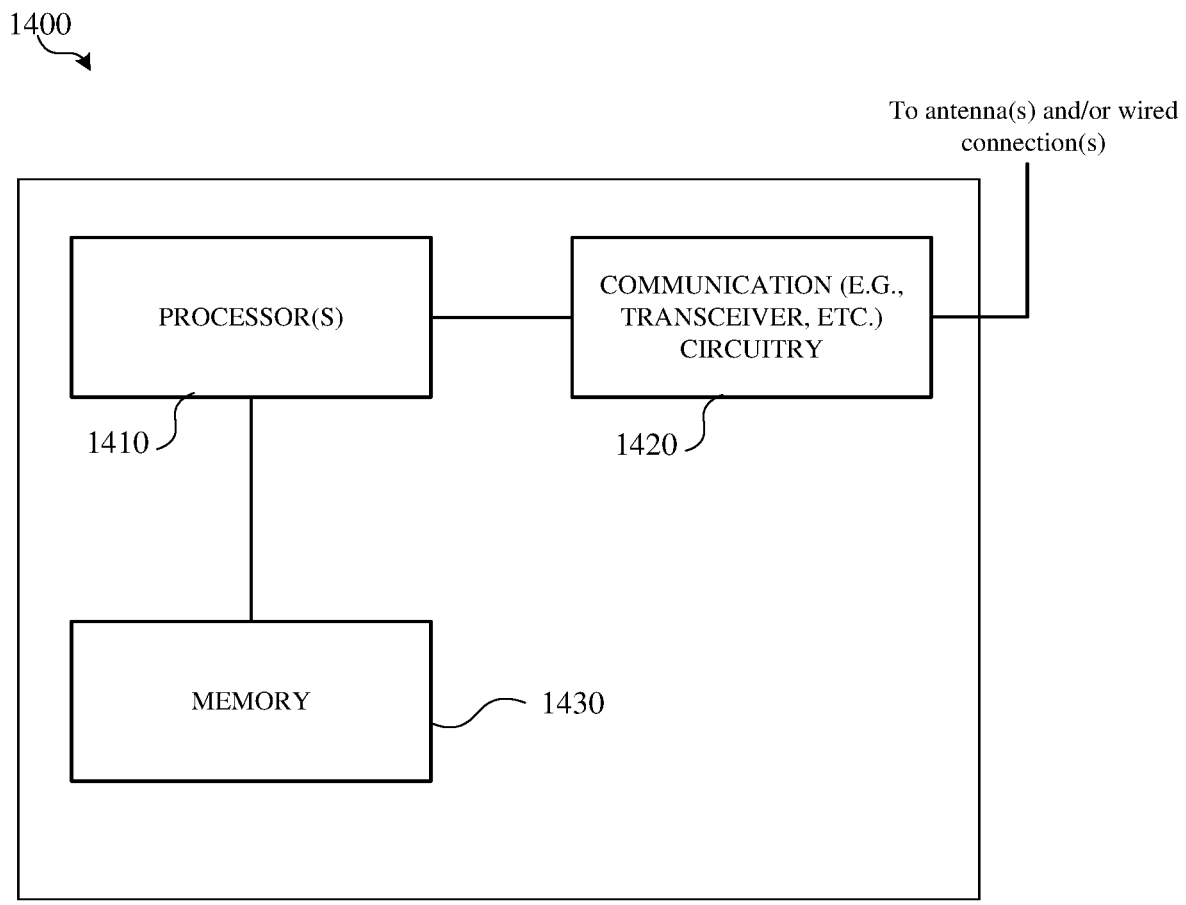
FIG. 14 illustrates a simplified block diagram of a user equipment wireless communication device or other network device/component in accordance with various aspects described.

Referring to FIG. 14, illustrated is a block diagram of a user equipment wireless communication device (UE) or other network device/component (e.g., UE1, UE2, UE3, UE4 or other participating entity) configured to perform direct peer-to-peer communications, according to various aspects described herein. The UE device 1400 includes one or more processors 1410 (e.g., one or more baseband processors) comprising processing circuitry and associated interface(s), transceiver circuitry 1420 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 1430 (which can comprise any of a variety of storage mediums and can store instructions and/or data associated with one or more of processor(s) 1410 or transceiver circuitry 1420).

In various embodiments (aspects) discussed herein, signals and/or messages can be generated and output for transmission, and/or transmitted messages can be received and processed. Depending on the type of signal or message generated, outputting for transmission (e.g., by processor(s) 1410, processor(s) 1410, etc.) can comprise one or more of the following: generating a set of associated bits that encode the content of the signal or message, coding (e.g., which can include adding a cyclic redundancy check (CRC) and/or coding via one or more of turbo code, low density parity-check (LDPC) code, tail-biting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 1410) can comprise one or more of: identifying physical resources associated with the signal/message, detecting the signal/message, resource element group de-interleaving, demodulation, descrambling, and/or decoding.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus employed in a user equipment (UE), comprising: processing circuitry configured to: enable a direct peer-to-peer communication with a PC5 unicast link for a PC5 vehicle-to-everything (V2X) communication; generate a radio status link detection based on a keep alive (KA) coordination scheme via the PC5 unicast link to monitor a status of the PC5 unicast link; and configure a KA timer based on the KA coordination scheme via the PC5 unicast link, wherein the KA coordination scheme is configured to reduce redundant KA requests in the PC5 unicast link to coordinate the direct peer-to-peer communication across the PC5 unicast link.

A second example can include the first example, wherein the processing circuitry is further configured to: initiate a direct link setup of the PC5 unicast link by generating a first PC5 message on the PC5 unicast link; and in response to providing the first PC5 message to generate the direct link setup of the PC5 unicast link, operate as a designated KA request initiator to provide any KA requests over the PC5 unicast link for the keep alive coordination scheme.

A third example can include the first or second example, wherein the processing circuitry is further configured to: provide a KA request via the PC5 unicast link based on one or more triggers comprising at least one of: an expiration of the KA timer, or a detection of a failure related to an access stratum/link layer or a lower layer of a protocol stack, wherein the failure comprises satisfying a threshold of at least one of: a block error rate (BLER), a noise level, a signal power, or a link parameter.

A fourth example can include any one or more of the first through third examples, wherein the processing circuitry is further configured to: determine a KA request initiator to initiate one or more KA requests between the UE and a peer UE of the PC5 unicast link based on whether a transmission or a reception of a PC5 message that is most current in time is associated with the UE or the peer UE.

A fifth example can include any one or more of the first through fourth examples, wherein the processing circuitry is further configured to: in response to providing a KA request, a KA acknowledgment or an establishment of a direct link setup via the PC5 unicast link: generate a random number via a random number generator; and add or subtract the random number to a number of T time units of the KA timer to determine an expiration for another KA request or another KA acknowledgment.

A sixth example can include any one or more of the first through fifth examples, wherein the processing circuitry is further configured to: configure a first round of a KA round robin process of the KA coordination scheme by: providing a first KA requests over the PC5 unicast link as a KA initiator based on a number of x time units associated with the KA timer; and receiving a first KA ACK over the PC5 unicast link in response to the first KA requests; configure a second round of the KA round robin process of the KA coordination scheme by: receiving a second KA request via the PC5 unicast link based on a number of y time units greater than a number of x time units with the KA timer; providing a second KA ACK over the PC5 unicast link in response to the second KA request.

A seventh example can include any one or more of the first through sixth examples, wherein the processing circuitry is further configured to: provide a KA request via the PC5 unicast link; determine whether the PC5 unicast link comprises an active link based on at least one of: a KA acknowledgment (ACK), or an implicit KA ACK indication that comprises any valid PC5 message or user traffic message via the PC5 unicast link; and stop the KA timer based on the PC5 unicast link comprising the active link.

An eighth example can include any one or more of the first through seventh examples, wherein the processing circuitry is further configured to: receive a KA request via the PC5 unicast link; initiate a KA ACK wait timer in response to receiving the KA request; and generate a KA ACK via the PC5 unicast link in response to an expiration of a KA ACK wait timer, or generate a PC5 signal/user traffic message on the PC5 unicast link before expiry of the KA ACK wait timer and stop the KA ACK wait timer for the PC5 signal/user traffic message to serve as an implicit KA ACK indication in response to the KA request.

A ninth example is a computer readable storage device storing executable instructions that, in response to execution, cause one or more processors of a vehicle user equipment (V-UE) to perform operations, the operations comprising: generating or processing a PC5 message over a PC5 unicast link for direct peer-to-peer communications; configuring a keep alive (KA) coordination scheme to reduce redundant or concurrent KA requests via the PC5 unicast link and monitor a status of the PC5 unicast link; and configuring a KA timer based on the KA coordination scheme.

A tenth example can include the ninth example, wherein the operations further comprise: establishing a direct link set-up of the PC5 unicast link via the PC5 message; operating as a KA request initiator to provide one or more KA requests over the PC5 unicast link based on having established the PC5 unicast link.

An eleventh example can include any one or more of the ninth through tenth examples, wherein the operations further comprise: providing a first KA request within a number of x time units of the KA timer in response to being a last device to transmit or receive the PC5 message over the PC5 unicast link; and receiving a KA acknowledgement (ACK) in response to the KA request or receiving a second KA request in response to an expiration of a number of y time units greater than a number of x time units associated with another KA timer of a peer UE of the PC5 unicast link.

An twelfth example can include any one or more of the ninth through eleventh examples, wherein the operations further comprise: providing a KA request via the PC5 unicast link based on a trigger comprising at least one of: an expiration of the KA timer, or a detection of a failure related to an access stratum/link layer or a lower layer of a protocol stack, wherein the failure comprises satisfying a threshold of at least one of: a block error rate (BLER), a noise level, a signal power, or a link parameter.

An thirteenth example can include any one or more of the ninth through twelfth examples, wherein the operations further comprise: broadcasting a KA request in response to a plurality of PC5 unicast links being active; and receiving one or more KA ACKs via one or more PC5 unicast links of the plurality of PC5 unicast links based on the broadcast KA request.

An fourteenth example can include any one or more of the ninth through thirteenth examples, wherein the operations further comprise: resending the KA request via at least one PC5 unicast link of the plurality of PC5 unicast links in response to a T-KA-retransmit timer expiring before receiving a KA ACK from the at least one PC5 unicast link of the plurality of PC5 unicast links.

An fourteenth example can include any one or more of the ninth through thirteenth examples, wherein the operations further comprise: broadcasting a broadcast KA request in response to a plurality of PC5 unicast links being active, or communicating a plurality of KA requests independently over the plurality PC5 unicast links, respectively; and receiving one or more KA ACKs via one or more PC5 unicast links of the plurality of PC5 unicast links based on the broadcast KA request or the plurality of KA requests, or receiving the one or more an alive indications in one or more broadcast messages based on the broadcast KA request or the plurality of KA requests.

A sixteenth example is a system for direct peer-to-peer communications between peer user equipments (UEs) comprising: a first UE comprising a first keep alive (KA) timer and first processing circuitry; wherein the processing circuitry of the first UE is configured to communicate a PC5 message via a PC5 unicast link for the direct peer-to-peer communications with a second UE, and enable a keep alive (KA) coordination scheme to reduce redundant or concurrent KA requests via the PC5 unicast link and configure the KA timer.

A seventeenth example can include the sixteenth example, wherein the processing circuitry is further configured to: generate a determination of whether the first UE or the second UE, coupled to the PC5 unicast link, operates as a KA request initiator to initiate one or more KA requests based on at least one of: an origination of a first PC5 message of a direct link setup for the PC5 unicast link, or from which of the first UE or the second UE a last action on the PC5 unicast link occurred, wherein the last action comprises a receiving or a transmitting of the PC5 message; and providing a KA request based on the determination of the KA request initiator.

An eighteenth example can include any one or more of the sixteenth through seventeenth examples, wherein the processing circuitry is further configured to: rotate a designation of a KA request initiator that provides a KA request via the PC5 unicast link between the first UE and the second UE according to a round robin process that changes the designation as the KA initiator between the first UE and the second UE among rounds of the round robin process in response to either the first UE or the second UE receiving a KA ACK or an additional KA request in lieu of the KA ACK.

An nineteenth example can include any one or more of the sixteenth through eighteenth examples, wherein the processing circuitry is further configured to: extend a keep alive interval at a subsequent round of the rounds of the round robin process by an increment value or function that is multiplied by a number of time units configured for the KA timer of the first UE and another timer of the second UE.

A twentieth example can include any one or more of the sixteenth through nineteenth examples, wherein the processing circuitry is further configured to: generate a fail-safe operation that fixes the designation of the KA request initiator between the rounds in response to receiving the additional KA request in lieu of the KA ACK in at least two consecutive rounds of the round robin process.

A twenty-first example can include any one or more of the sixteenth through twentieth examples, wherein the second UE comprises a vehicle-to-infrastructure (V2I) UE or a road side unit (RSU) that is coupled to a power source as a permanent power source, and the first UE is configured to enable the second UE to operate as a KA initiator that provides one or more KA requests via the PC5 unicast link with a lower timer than the first UE in response to being coupled to the power source.

The embodiments (aspects or examples) herein can together or individually include Layer-2 link maintenance procedure(s) over PC5 reference point as the KA procedures/operations discussed herein including at least: 0. Unicast link set up; 1. a KA request; 2. a KA ACK.

The PC5 Signaling Protocol supports keep-alive functionality that is used to detect if a particular PC5 unicast link (or PC5 link/messaging link) is still valid. Either side of the PC5 unicast link (e.g., link 214 or the like), for example, can initiate a layer-2 link maintenance procedure (i.e., keep-alive procedure(s)), based on for example triggers from the AS layer or internal timers. The UEs (e.g., UE1 101 or any participant peer 240) can operate to minimize the keep-alive signaling (e.g., 1. cancel the procedure if data are successfully received over the PC5 unicast link; 2. co-ordinate implicitly or explicitly to ensure chances of keep alive collision (e.g., redundant or concurrent KA requests over the link) is reduced.

Some of the embodiments to be considered are (e.g., 1. the UE which initiated the DIRECT LINK ESTABLISHMENT procedure may be configured with a smaller timer, while the peer UE may be configured with a larger timer; 2. both UEs may independently generate and add a randomly generated number to the timer value, or their respective timer values).

It could be further studied whether keep alive timer value may be exchanged in the DIRECT LINK ESTABLISHMENT procedure. It could be further on what is the range for the random number. The direct link establishment can comprise: 0. UE-1 and UE-2 have a unicast link established as described in clause 6.3.3.1 of TS 23.287 of 3GPP Release 16 or beyond; 1. based on trigger conditions, UE-1 sends a Keep-alive message to UE-2 in order to determine the status of the PC5 unicast link; 2. Upon reception of the Keep-alive message, UE-2 responds with a Keep-alive Ack message. The exact triggers for the keep-alive messages (KA requests/acknowledgment) can be further studied as well as the embodiments herein this disclosure. For example, the trigger can be based on a timer associated with the Layer-2 link. Another trigger can be based on degrading lower layer link conditions (e.g. High BLER, or the lik). The timer can be reset with a successful reception event defined by TS 38.300.

The UE initiating the keep-alive procedure can determine the follow up actions based on the result of the signaling, e.g. proceed with implicit layer-2 link release. For example, a successful reception event can also cancel the layer-2 link release if received in time.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A baseband processor for a user equipment (UE) configured to, when executing instructions stored in a memory, perform operations comprising:
   communicating using a PC5 unicast link for PC5 vehicle-to-everything (V2X) communication;
   configuring a keep alive (KA) coordination scheme to monitor a status of the PC5unicast link; and
   configuring a first KA timer based on the KA coordination scheme, including, generating a random number via a random number generator, and adding or subtracting the random number to a KA timer value.

2. The baseband processor of claim 1, wherein the operations further comprise:
   initiating a direct link setup of the PC5 unicast link by generating a first PC5 message for transmission via the PC5 unicast link; and
   in response to providing the first PC5 message to generate the direct link setup of the PC5 unicast link, operating as a designated KA request initiator to by providing a first KA request over the PC5 unicast link for the KA coordination scheme.

3. The baseband processor of claim 1, wherein the operations further comprise:
   providing a first KA request for transmission via the PC5 unicast link based on one or more triggers comprising at least one of: an expiration of the first KA timer, or a detection of a failure related to an access stratum/link layer or a lower layer of a protocol stack, wherein the failure comprises satisfying a threshold of at least one of: a block error rate (BLER), a noise level, a signal power, or a link parameter.

4. The baseband processor of claim 1, wherein the operations further comprise:
   determining a KA request initiator to initiate the a first KA request between the UE and a peer UE of the PC5 unicast link based on whether a transmission or a reception of a PC5 message that is most current in time is associated with the UE or the peer UE.

5. The baseband processor of claim 1, wherein:
   the generating of the random number and the adding or subtracting of the random number are in response to providing a first KA request, a KA acknowledgment (ACK), or an establishment of a direct link setup via the PC5 unicast link, and wherein the operations further comprise:
      determining an expiration for another KA request or another KA ACK based on the first KA timer.

6. The baseband processor of claim 1, wherein the operations further comprise:
   performing a KA round robin process of the KA coordination scheme by:
      providing a first KA request for transmission over the PC5 unicast link in response to an expiration of the first KA timer; and
   receiving a first KA acknowledgment (ACK) via the PC5 unicast link in response to the first KA request;
      configuring a second KA timer with a duration greater than the first KA timer;
      receiving a second KA request via the PC5 unicast link before expiration of the second KA timer; and
   providing a second KA ACK for transmission via the PC5 unicast link in response to the second KA request.

7. The baseband processor of claim 1, wherein the operations further comprise:
   providing a KA request for transmission via the PC5 unicast link;
   determining whether the PC5 unicast link comprises an active link based on at least one of: a KA acknowledgement (ACK), or an implicit KA ACK indication that comprises any valid PC5 message or user traffic message via the PC5 unicast link; and
   stopping the first KA timer based on the PC5 unicast link comprising the active link.

8. The baseband processor of claim 1, wherein the operations further comprise:
   receiving a KA request via the PC5 unicast link;
   initiating a KA acknowledgement (ACK) wait timer in response to receiving the KA request; and
   generating a KA ACK for transmission via the PC5 unicast link in response to an expiration of the KA ACK wait timer, or generating a PC5 signal/user traffic message on the PC5 unicast link before expiry of the KA ACK wait timer and stopping the KA ACK wait timer for the PC5 signal/user traffic message to serve as an implicit KA ACK indication in response to the second KA request.

9. A non-transitory computer readable storage device storing executable instructions that, in response to execution, cause one or more processors of a vehicle user equipment (V-UE) to perform operations, comprising:
   generating or processing a PC5 message over a PC5 unicast link for direct peer-to-peer communications;
   configuring a keep alive (KA) coordination scheme to monitor a status of the PC5 unicast link;
   configuring a first KA timer based on the KA coordination scheme;
   providing a first KA request in response to an expiration of the first KA timer and the V-UE being a last device to transmit or receive a PC5 message over the PC5 unicast link; and
   receiving a KA acknowledgement (ACK) in response to the first KA request or receiving a second KA request in response to an expiration of a second KA timer having a greater duration than the first KA timer, wherein the second KA timer is associated with a peer UE of the PC5 unicast link.

10. The non-transitory computer readable storage device of claim 9, wherein the operations further comprise:
    establishing a direct link set-up of the PC5 unicast link via the PC5 message; and
    operating as a KA request initiator by providing the first KA request over the PC5 unicast link for the KA coordination scheme.

11. The non-transitory computer readable storage device of claim 9, wherein the operations further comprise:
    providing the first KA request for transmission via the PC5 unicast link based on a trigger comprising at least one of: an expiration of the first KA timer, or a detection of a failure related to an access stratum/link layer or a lower layer of a protocol stack, wherein the failure comprises satisfying a threshold of at least one of: a block error rate (BLER), a noise level, a signal power, or a link parameter.

12. The non-transitory computer readable storage device of claim 9, wherein the operations further comprise:
broadcasting the first KA request in response to a plurality of PC5 unicast links being active; and
receiving one or more KA ACKs via one or more PC5 unicast links of the plurality of PC5 unicast links based on the broadcast KA request.

13. The non-transitory computer readable storage device of claim 12, wherein the operations further comprise:
resending the first KA request via at least one PC5 unicast link of the plurality of PC5 unicast links in response to a T-KA-retransmit timer expiring before receiving a KA ACK from the at least one PC5 unicast link of the plurality of PC5 unicast links.

14. The non-transitory computer readable storage device of claim 9, wherein the operations further comprise:
broadcasting a broadcast KA request in response to a plurality of PC5 unicast links being active, or communicating a plurality of KA requests independently over the plurality of PC5 unicast links, respectively; and
receiving one or more KA ACKs via one or more PC5 unicast links of the plurality of PC5 unicast links based on the broadcast KA request or the plurality of KA requests, or receiving one or more KA indications in one or more broadcast messages based on the broadcast KA request or the plurality of KA requests.

15. The non-transitory computer readable storage device of claim 9, wherein the operations further comprise:
determining whether the PC5 unicast link comprises an active link based on at least one of: the KA ACK, or an implicit KA ACK indication that comprises any valid PC5 message or user traffic message via the PC5 unicast link; and
stopping the first KA timer based on the PC5 unicast link comprising the active link.

16. A method for a user equipment (UE), comprising:
communicating using a PC5 unicast link for PC5 vehicle-to-everything (V2X) communication;
configuring a keep alive (KA) coordination scheme to monitor a status of the PC5 unicast link;
performing a KA round robin process of the KA coordination scheme by:
configuring a first KA timer;
providing a first KA request for transmission over the PC5 unicast link in response to an expiration of the first KA timer; and
receiving a first KA acknowledgement (ACK) via the PC5 unicast link in response to the first KA request;
configuring a second KA timer having a greater duration than the first KA timer;
receiving a second KA request via the PC5 unicast link before expiration of the second KA timer; and
providing a second KA ACK for transmission over the PC5 unicast link in response to the second KA request.

17. The method of claim 16, further comprising:
determining whether the PC5 unicast link comprises an active link based on at least one of: a KA ACK, or an implicit KA ACK indication that comprises any valid PC5 message or user traffic message via the PC5 unicast link; and
stopping a KA timer based on the PC5 unicast link comprising the active link.

\* \* \* \* \*